(12) United States Patent
Takizawa et al.

(10) Patent No.: US 10,627,971 B2
(45) Date of Patent: Apr. 21, 2020

(54) CONDUCTIVE FILM, TOUCH PANEL, AND DISPLAY DEVICE

(71) Applicant: VTS-Touchsensor Co., Ltd., Higashiomi-shi, Shiga (JP)

(72) Inventors: Yumi Takizawa, Tokyo (JP); Tomohiro Nakagome, Tokyo (JP)

(73) Assignee: VTS-Touchsensor Co., Ltd., Higashiomi-shi, Shiga (JP)

( * ) Notice: Subject to any disclaimer, the term of this patent is extended or adjusted under 35 U.S.C. 154(b) by 0 days.

(21) Appl. No.: 16/165,571

(22) Filed: Oct. 19, 2018

(65) Prior Publication Data

US 2019/0121469 A1    Apr. 25, 2019

(30) Foreign Application Priority Data

Oct. 20, 2017 (JP) ................................. 2017-203313

(51) Int. Cl.
| | |
|---|---|
| *G03F 1/60* | (2012.01) |
| *G06F 3/044* | (2006.01) |
| *B32B 7/12* | (2006.01) |
| *B32B 27/06* | (2006.01) |

(52) U.S. Cl.
CPC ............... *G06F 3/044* (2013.01); *B32B 7/12* (2013.01); *B32B 27/06* (2013.01); *B32B 2307/204* (2013.01); *B32B 2457/208* (2013.01)

(58) Field of Classification Search
CPC ..... G03F 1/60; G03F 1/22; G03F 1/24; G03F 1/50; G03F 1/80
See application file for complete search history.

(56) References Cited

U.S. PATENT DOCUMENTS

| | | | |
|---|---|---|---|
| 2015/0198972 A1 | 7/2015 | Iwami et al. | |
| 2015/0205196 A1* | 7/2015 | Orihara | ..................... G03F 1/24 430/5 |
| 2015/0331312 A1* | 11/2015 | Hamamoto | ............... G03F 1/84 430/5 |
| 2015/0331526 A1 | 11/2015 | Hashida | |

(Continued)

FOREIGN PATENT DOCUMENTS

| | | |
|---|---|---|
| EP | 2 985 750 A1 | 2/2016 |
| EP | 3 166 375 A1 | 5/2017 |
| JP | 2016 212518 A | 12/2016 |

(Continued)

*Primary Examiner* — Olga V Merkoulova
(74) *Attorney, Agent, or Firm* — McGlew and Tuttle, P.C.

(57) ABSTRACT

The problem addressed lies in providing a conductive film, a touch panel and a display device which make it possible to suppress a deterioration in the quality of images observed on the display device. In a power spectrum obtained by means of a two-dimensional Fourier transform of each of an electrode wire pattern formed from electrode wires which bend irregularly and a reference pattern formed by regular bent lines, a value obtained by dividing, at predetermined frequency widths, the cumulative value of spectral intensity of each frequency width by the frequency width is a spectral density, and a first evaluation value, which is a common logarithm of a value obtained by dividing the cumulative value of the spectral density in a defined frequency region of the electrode wire pattern by the cumulative value of the spectral density in a defined frequency region of the reference pattern, is 3.6 or less.

6 Claims, 19 Drawing Sheets

(56) References Cited

U.S. PATENT DOCUMENTS

2018/0011010 A1* 1/2018 Chang .................... B01J 20/06
2018/0336840 A1* 11/2018 Niikura ................. C09K 19/02

FOREIGN PATENT DOCUMENTS

| JP | 2017 130112 A | 7/2017 |
| TW | 201539282 A | 10/2015 |
| TW | 201706802 A | 2/2017 |
| WO | 2014/115831 A1 | 7/2014 |
| WO | 2016/174986 A1 | 11/2016 |

* cited by examiner

[Fig. 1]
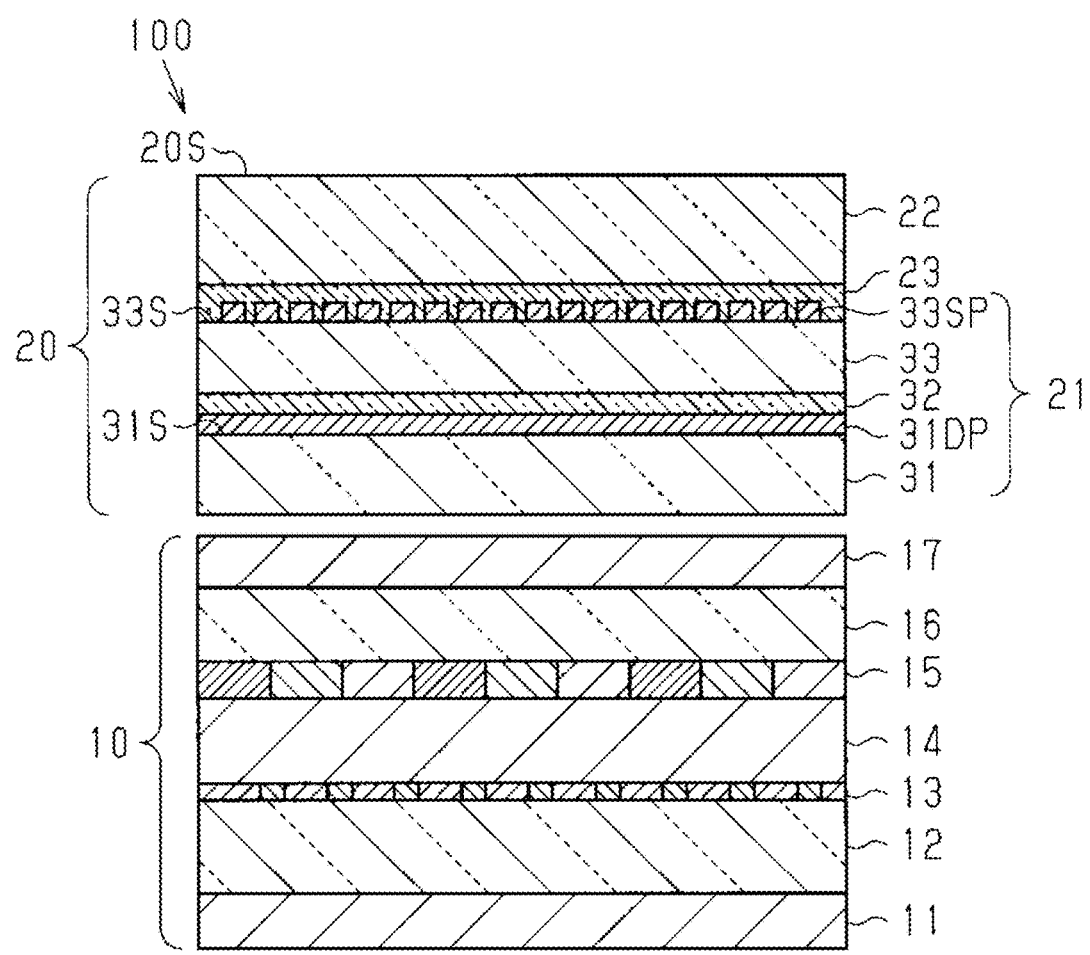

[Fig. 2]
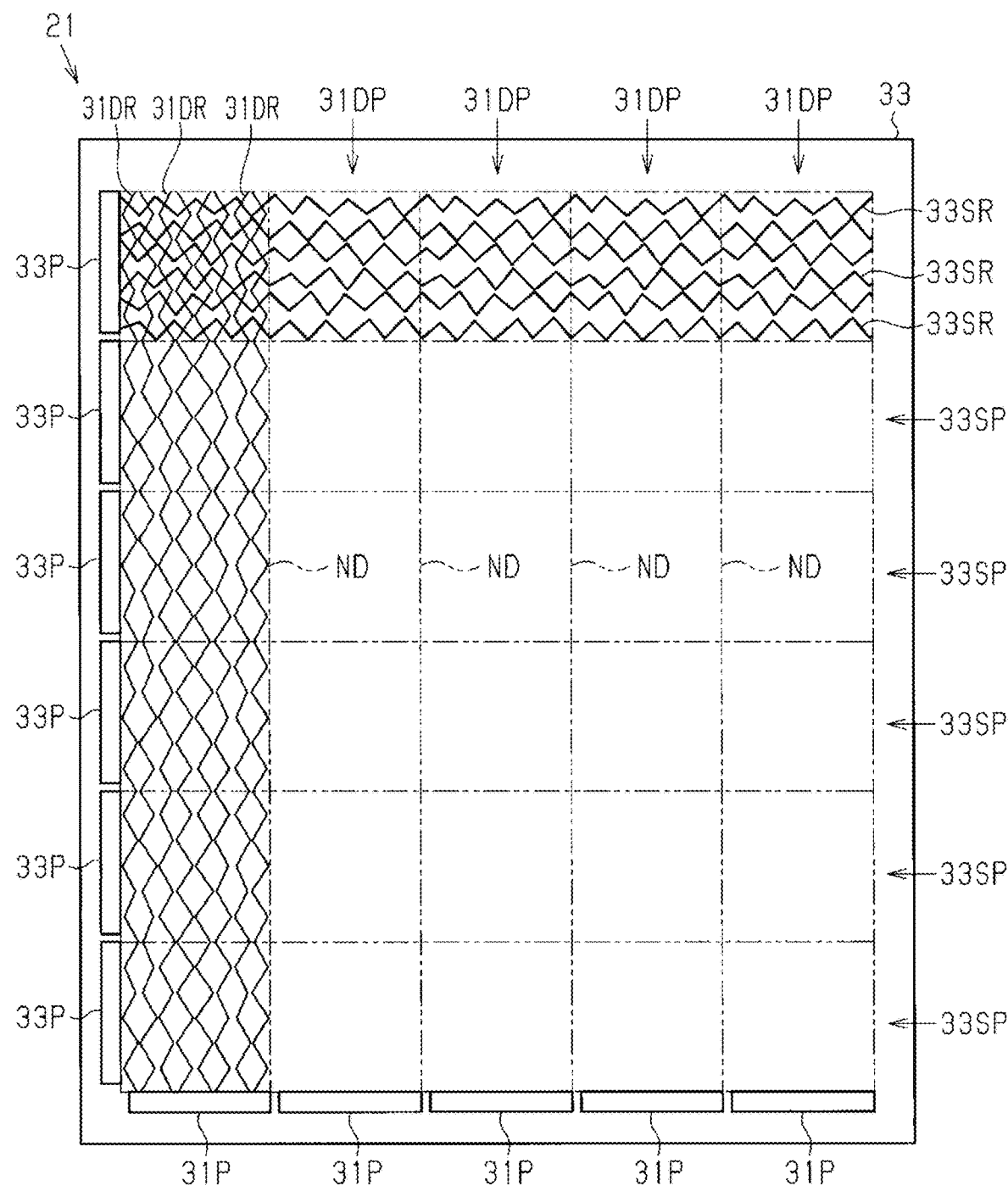

[Fig. 3]
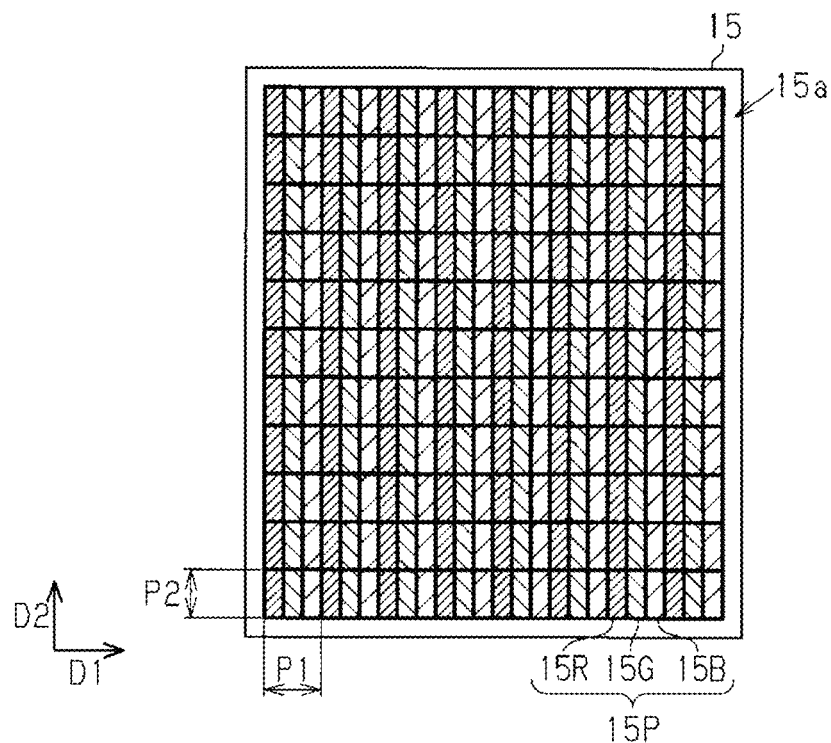
[Fig. 4]
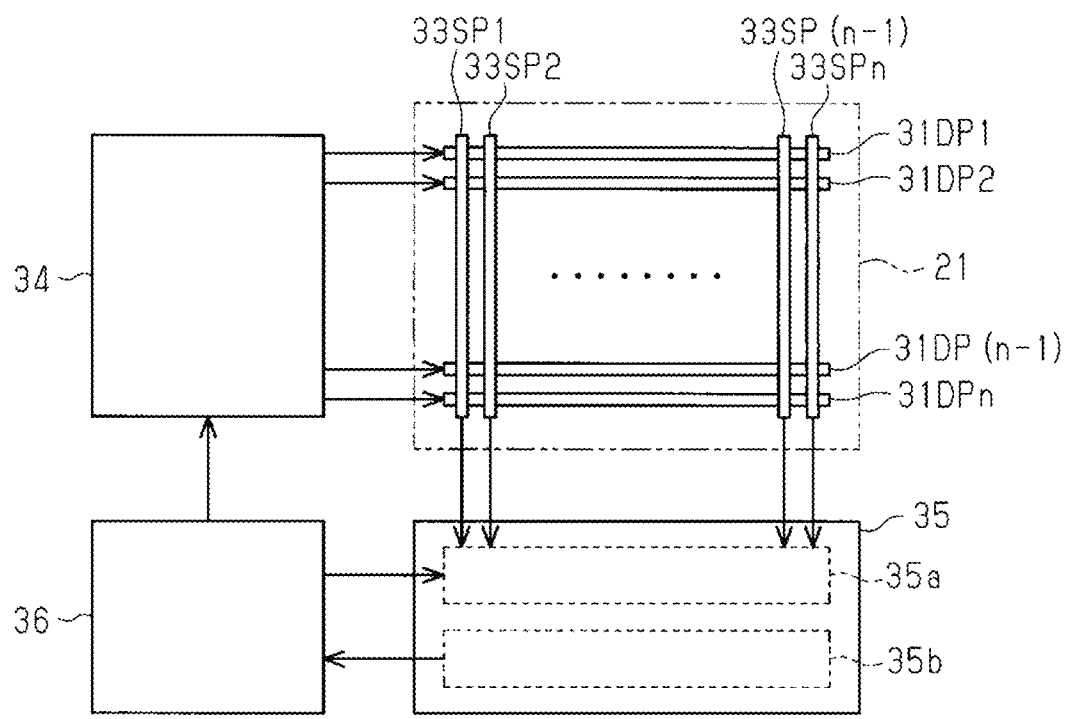

[Fig. 5]
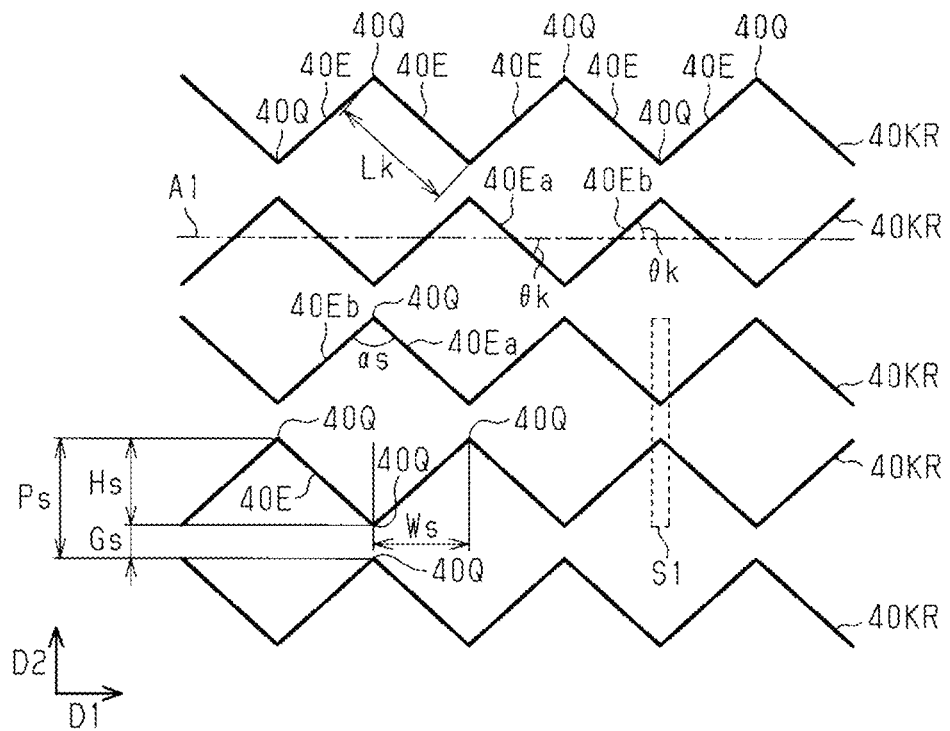
[Fig. 6]
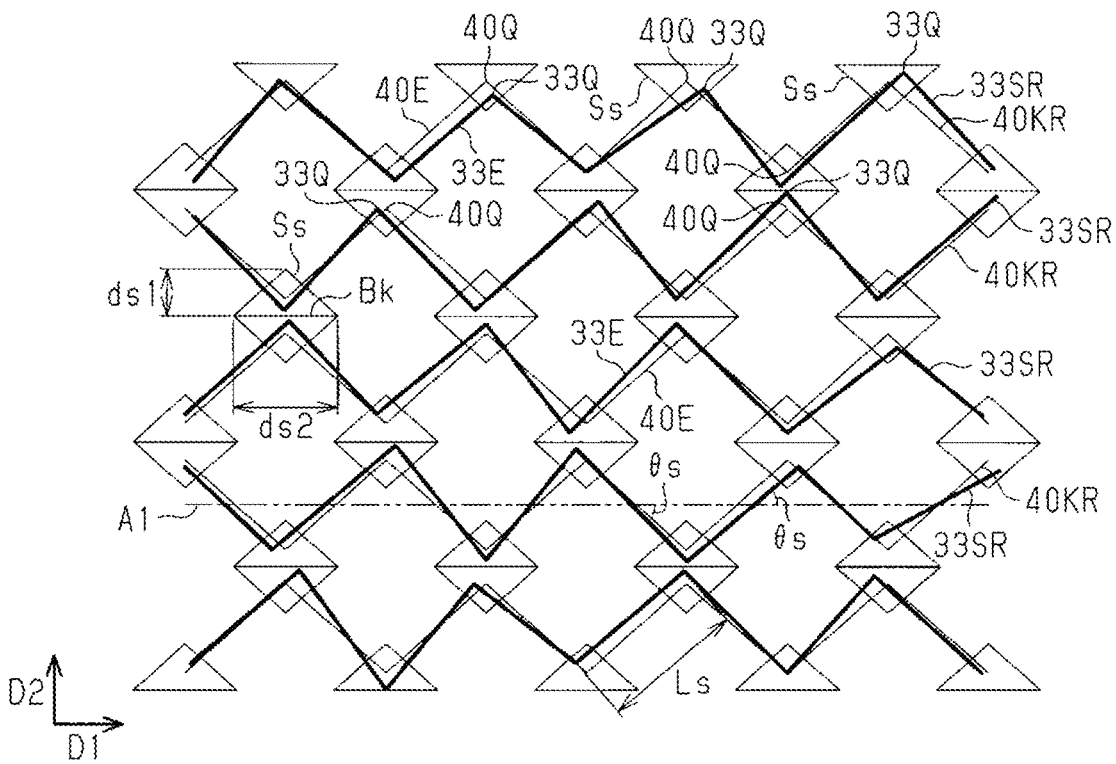

[Fig. 7]
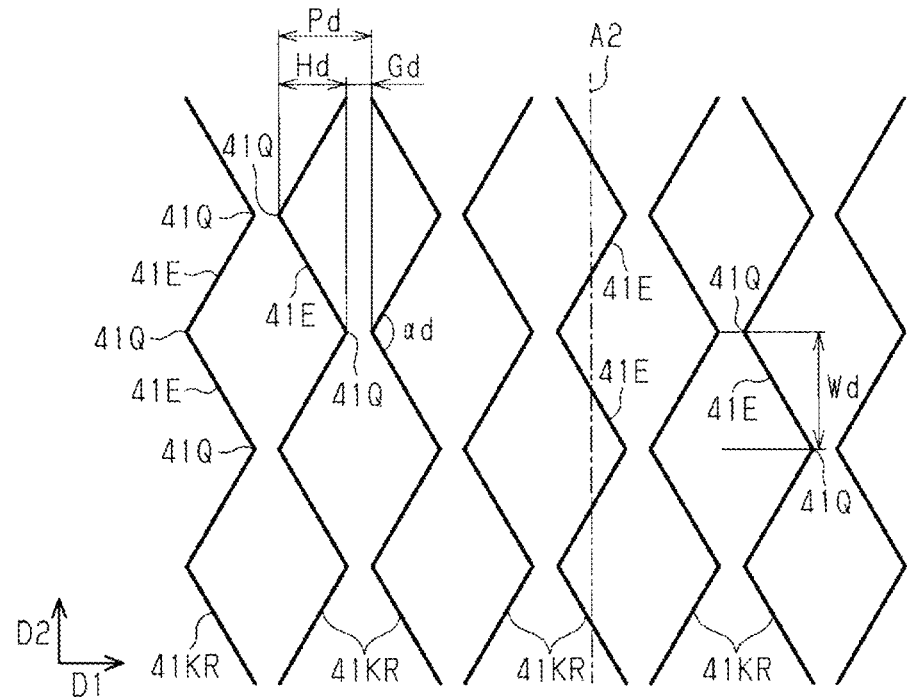
[Fig. 8]
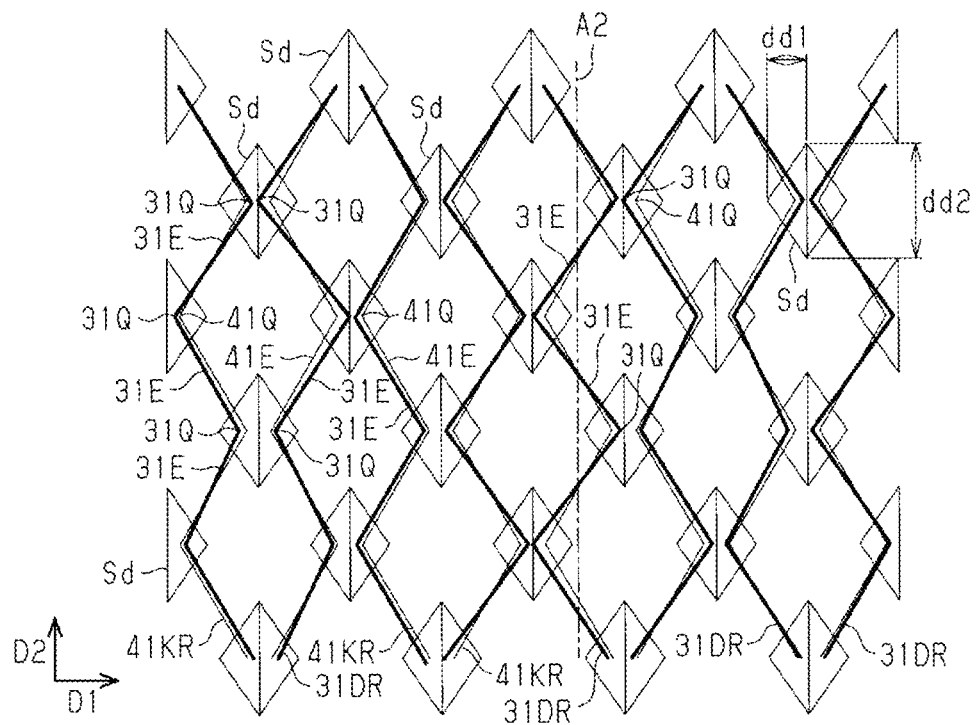

[Fig. 9]
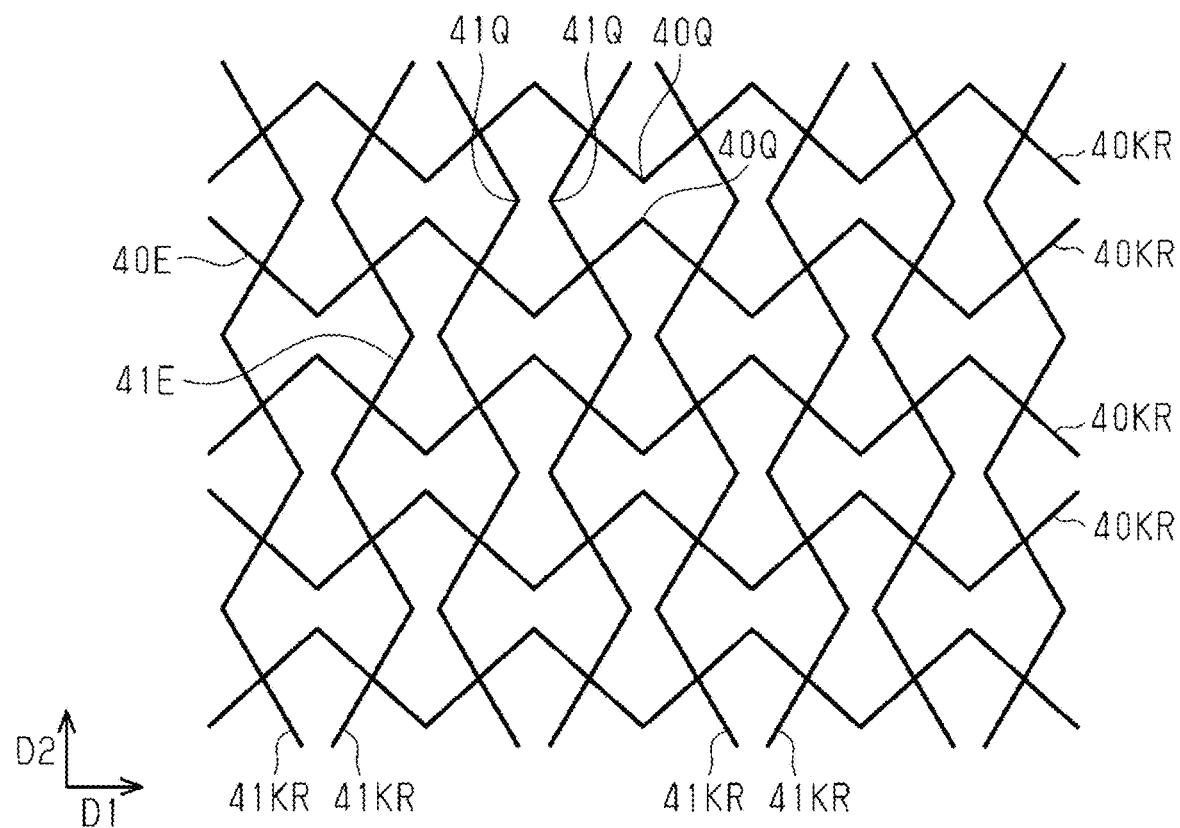

[Fig. 10]
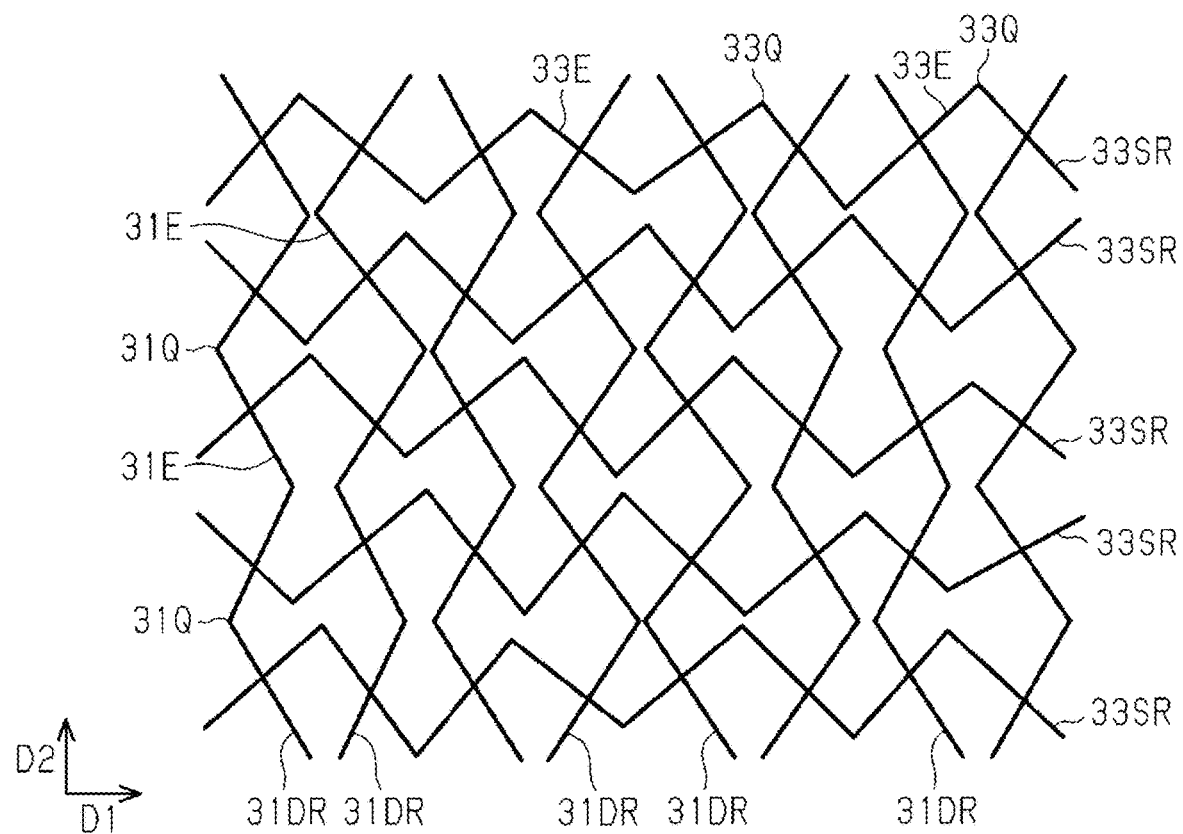

[Fig. 11]
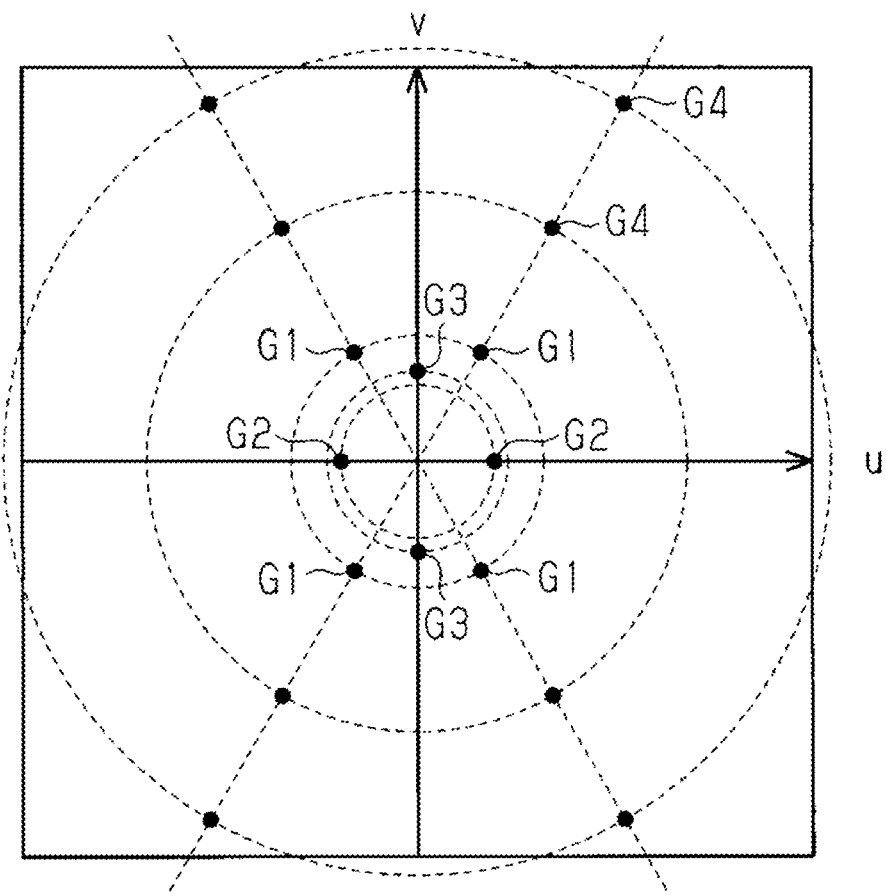

[Fig. 12]
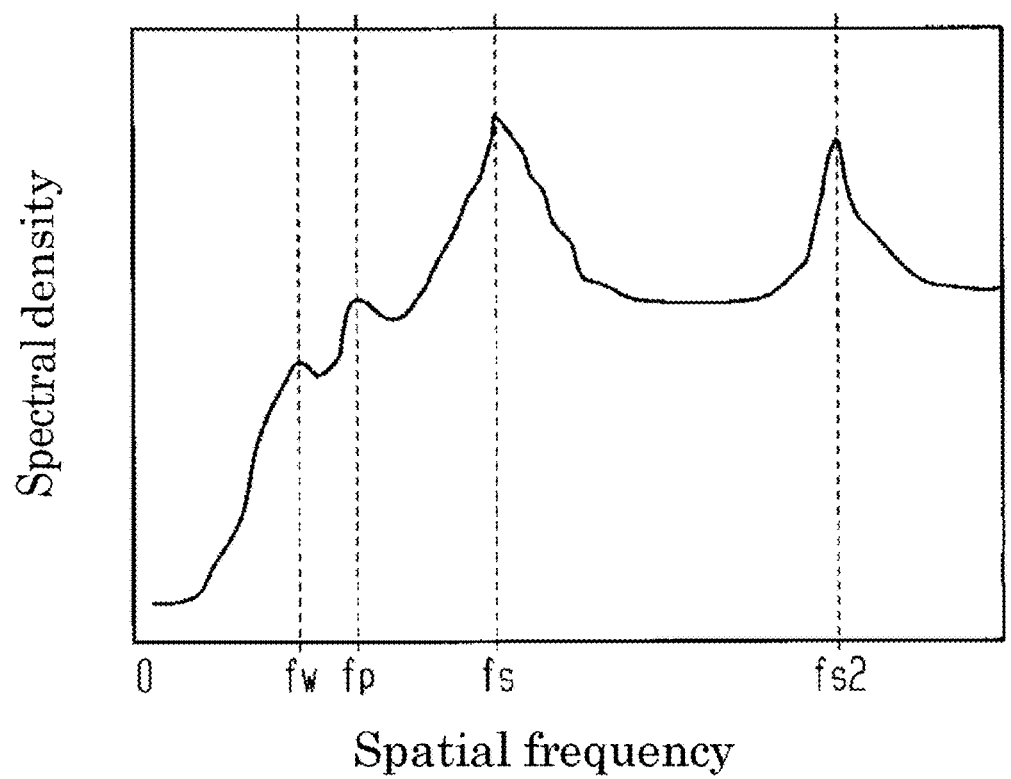

[Fig. 13]
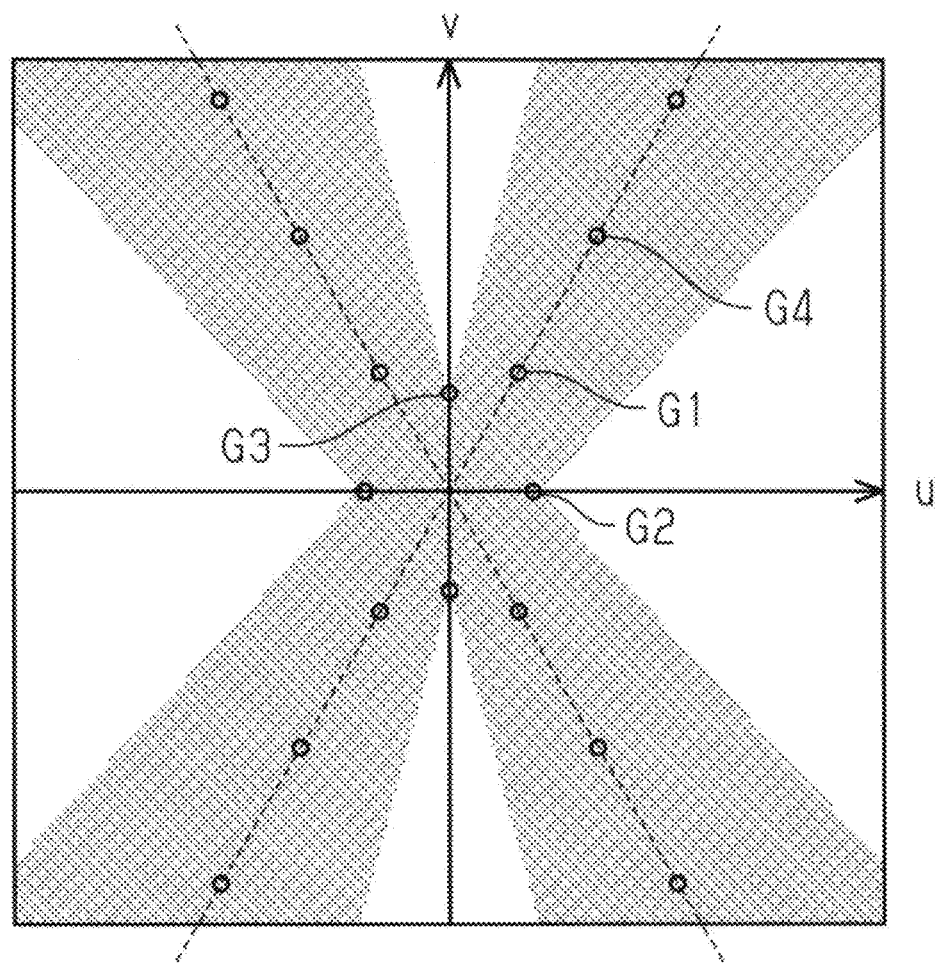

[Fig. 14]
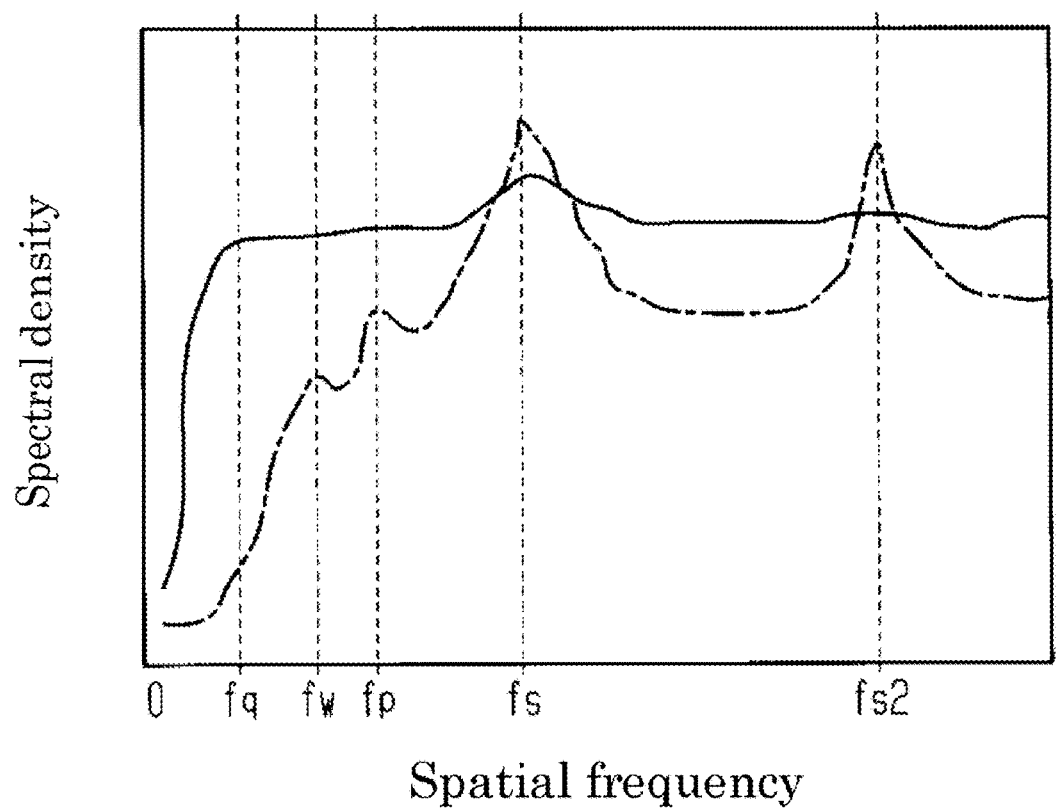

[Fig. 15]
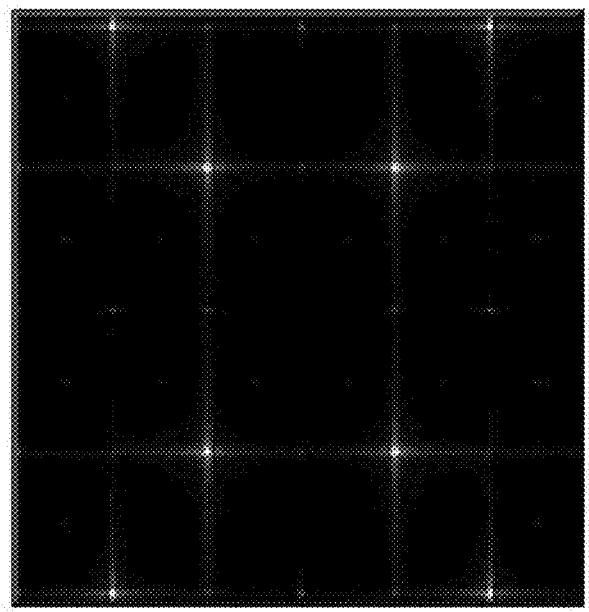

[Fig. 16]
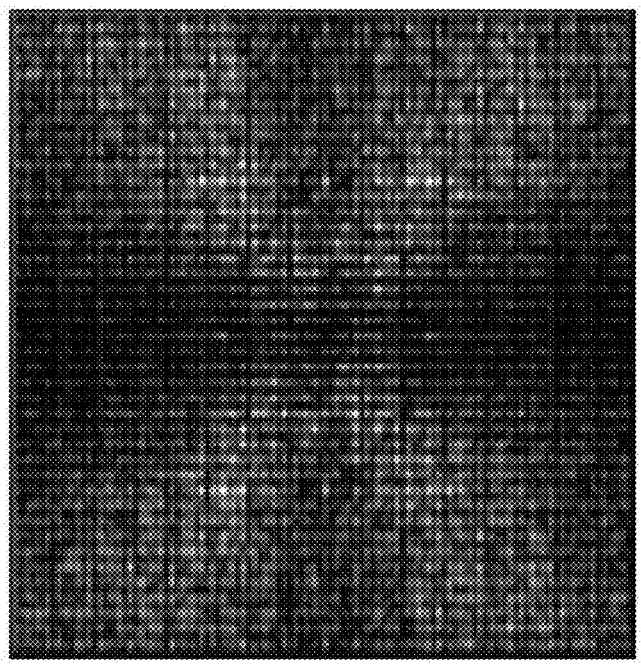

[Fig. 17]
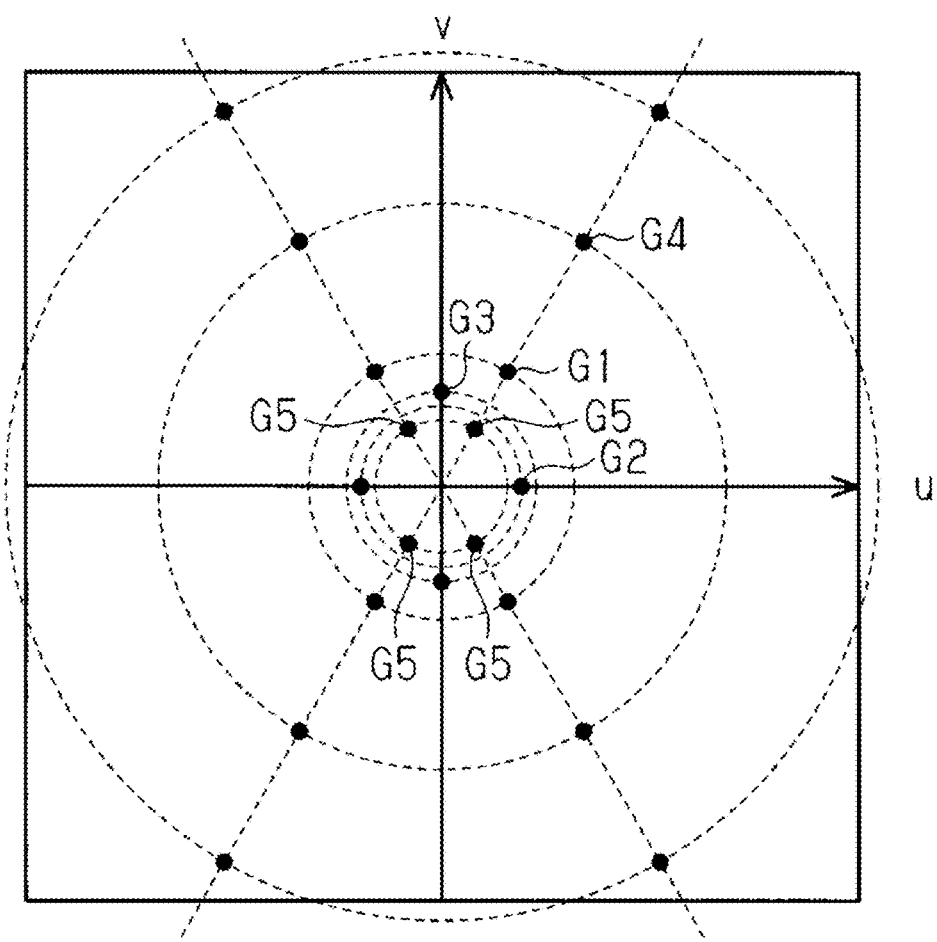

[Fig. 18]
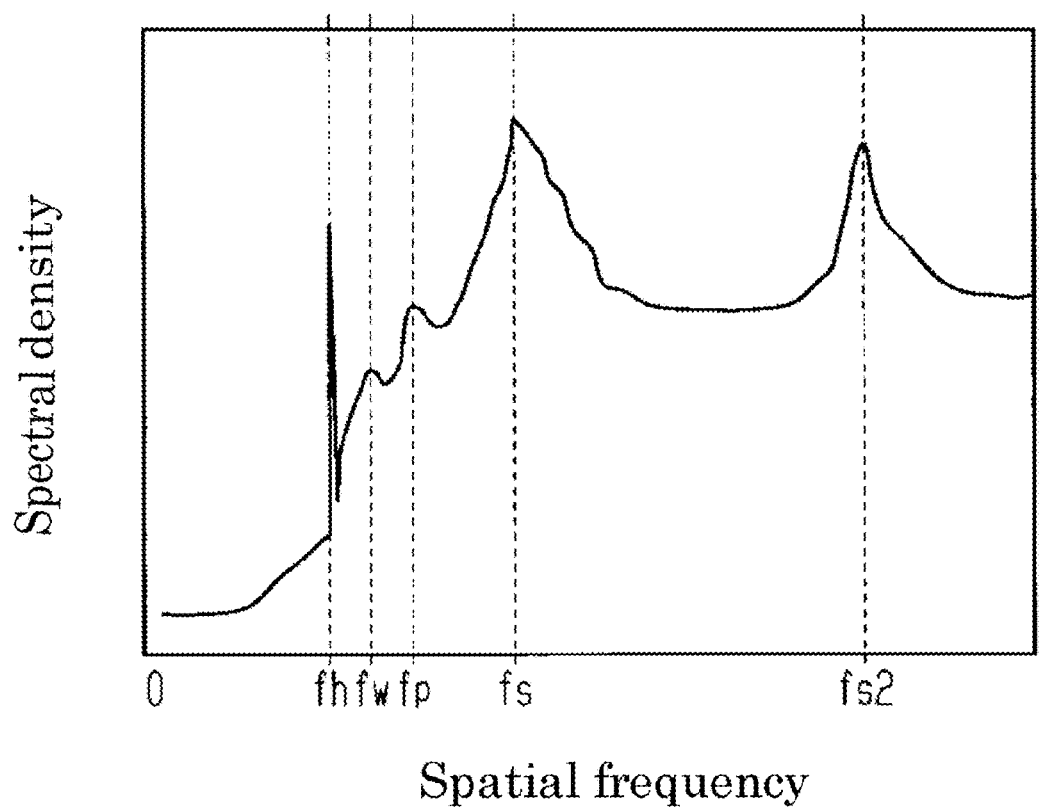

[Fig. 19]
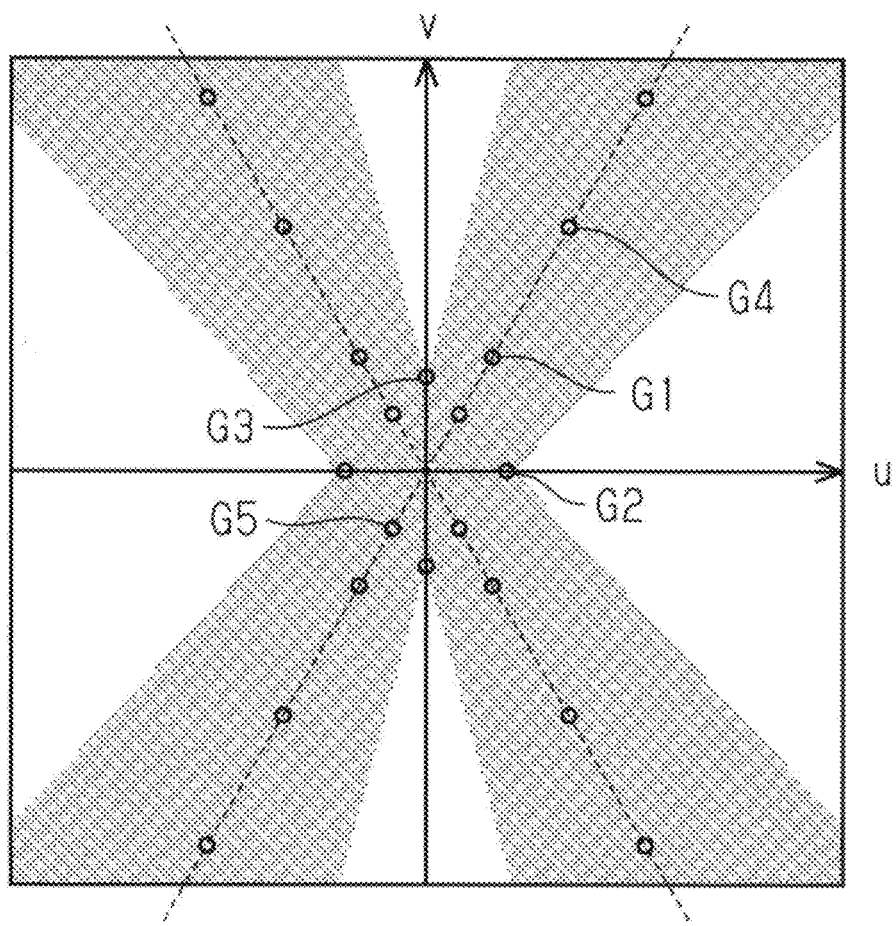

[Fig. 20]
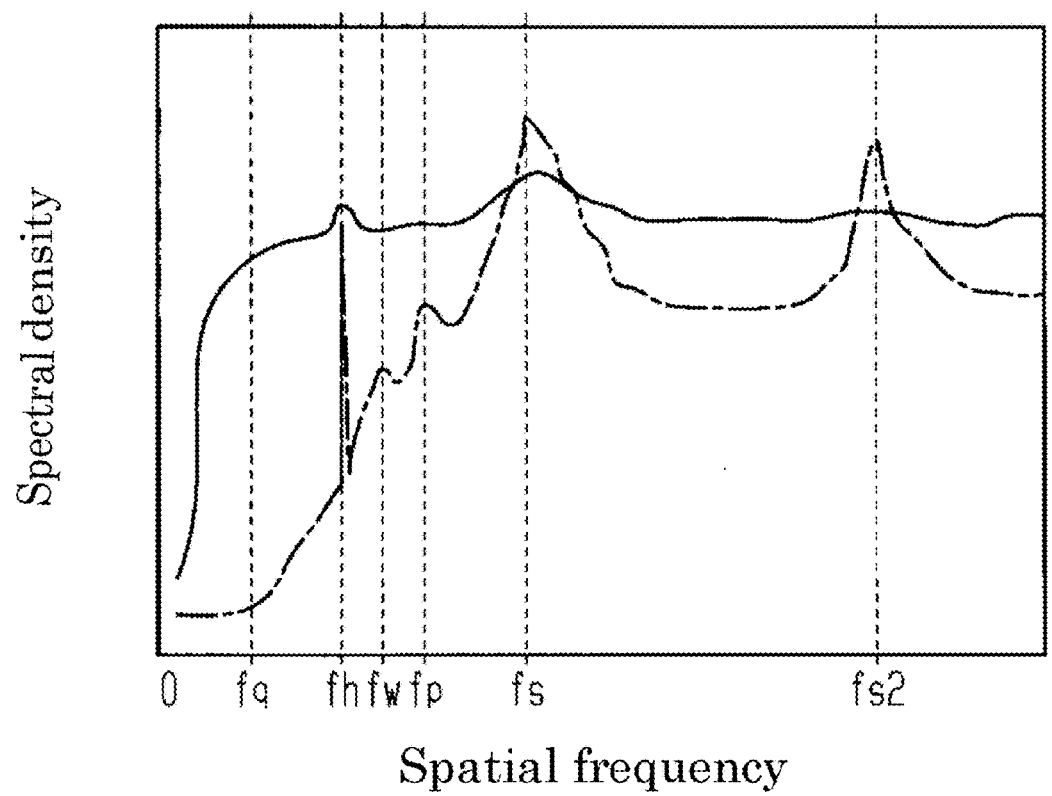

[Fig. 21]
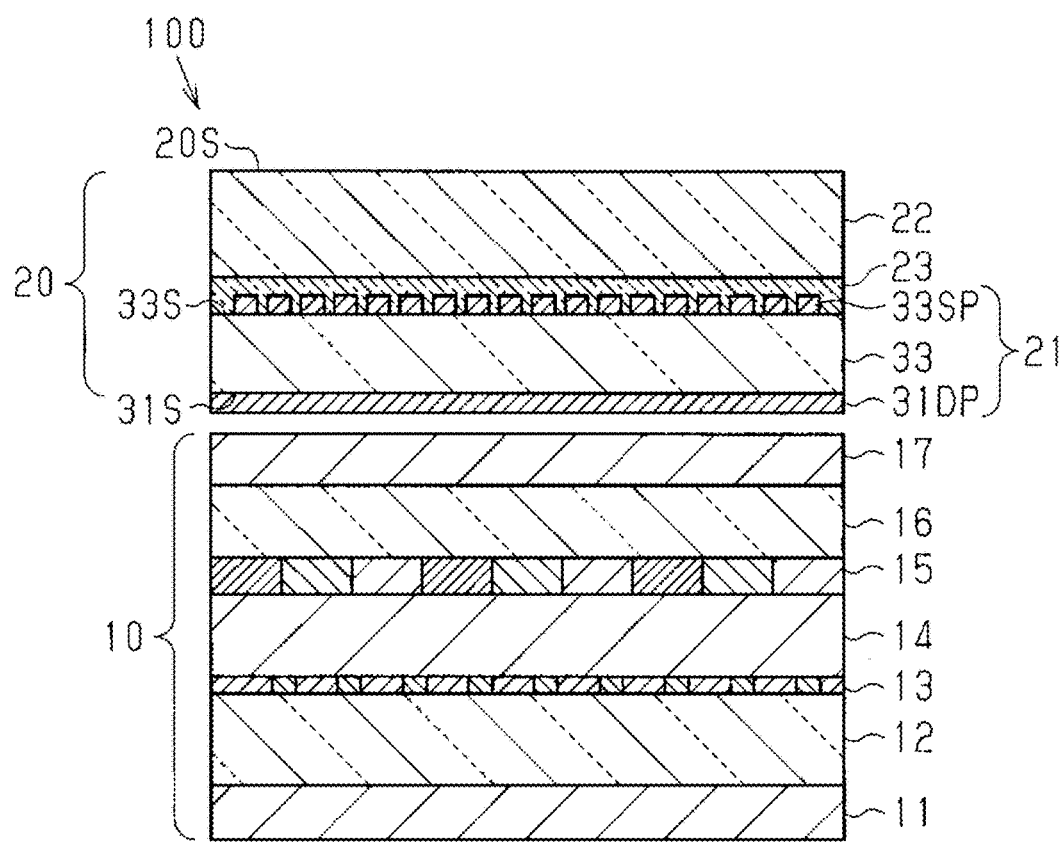

[Fig. 22]
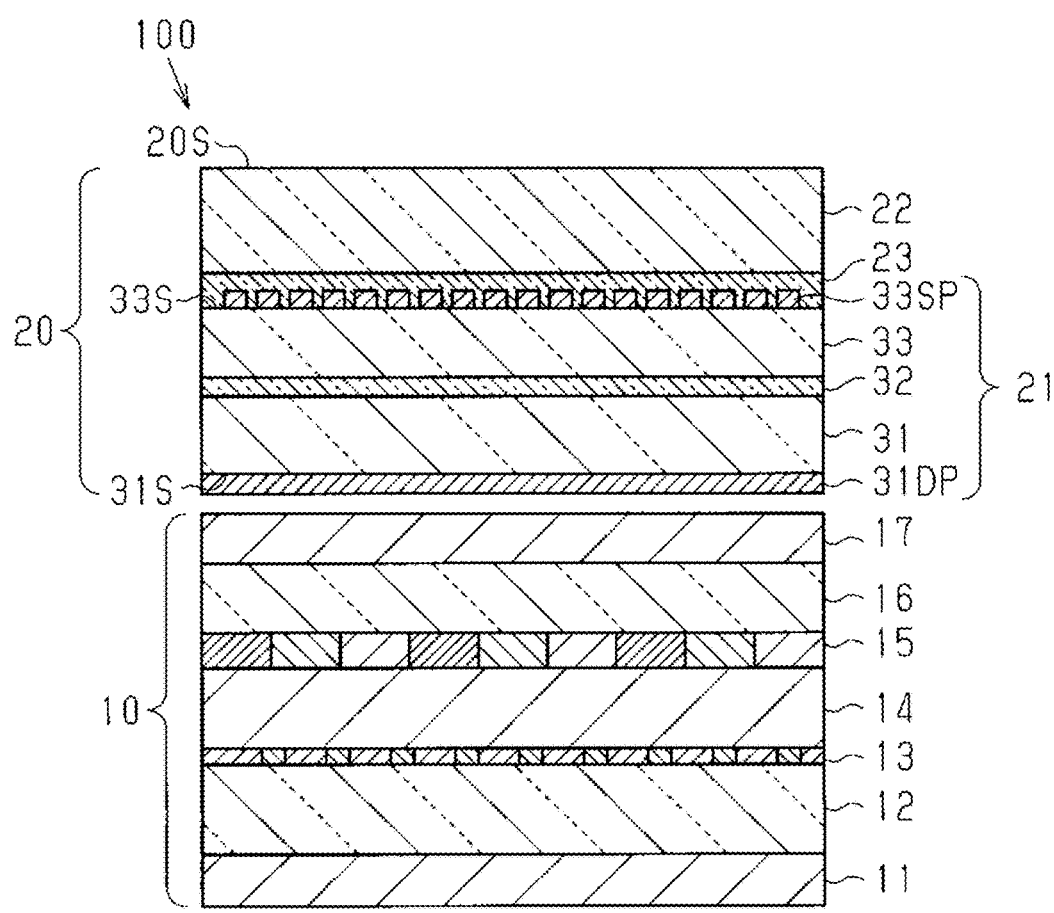

CONDUCTIVE FILM, TOUCH PANEL, AND DISPLAY DEVICE

CROSS-REFERENCE TO RELATED APPLICATIONS

This application claims priority of Japanese application 2017-203 313 filed Oct. 20, 2017, pursuant to 35 U.S.C 119 (a)-(d) the content of which is incorporated herein by reference in its entirety as if fully set forth herein.

FIELD OF THE INVENTION

The present invention relates to a conductive film comprising a plurality of electrode wires, a touch panel comprising said conductive film, and a display device comprising said touch panel.

BACKGROUND OF THE INVENTION

A display device employing a touch panel as an input device comprises: a display panel for displaying an image, and the touch panel which is placed over the display panel. An electrostatic capacitance method, in which contact of a finger or the like with an operating surface of the touch panel is detected as a change in electrostatic capacity, is widely used as a method for detecting a contact position of a finger or the like on the touch panel. In a touch panel employing an electrostatic capacitance method, a conductive film of the touch panel comprises: a plurality of first electrodes extending along a first direction, a plurality of second electrodes extending along a second direction orthogonal to the first direction, and a transparent dielectric layer interposed between the first electrodes and the second electrodes. The contact position of a finger or the like on the operating surface is then detected on the basis of a change in electrostatic capacity between one first electrode and each of the plurality of second electrodes being detected for each first electrode.

In one example of such a conductive film, each of the plurality of first electrodes comprises a plurality of first electrode wires extending along the first direction, and each of the plurality of second electrodes comprises a plurality of second electrode wires extending along the second direction. Thin wires comprising a metal such as silver or copper are used as the electrode wires. Using a metal as the material for the electrode wires allows a rapid response and a high resolution to be obtained when the position of contact is detected, while also enabling an increase in the size of the touch panel and a reduction in production costs.

In a form in which the electrode wires comprise a metal which absorbs or reflects visible light, the plurality of first electrode wires and the plurality of second electrode wires form a grid-shaped pattern in which the electrode wires are orthogonal to one another, when viewed from a direction facing the operating surface. Meanwhile, in the display panel to which the touch panel is laminated, a grid-shaped pattern is also formed by a black matrix defining a plurality of pixels along the first direction and the second direction.

In the abovementioned configuration, the interval between adjacent first electrode wires is generally different from the interval in the second direction between adjacent pixels, and the interval between adjacent second electrode wires is different from the interval in the first direction between adjacent pixels. Furthermore, when viewed from a direction facing the operating surface, a grid-shaped periodic structure formed by the first electrode wires and the second electrode wires lies over a grid-shaped periodic structure defining the pixels, as a result of which an offset between the two periodic structures may give rise to moiré. Observing moiré causes a deterioration in the quality of images observed on the display device.

One countermeasure that has been proposed to suppress such moiré is to reduce the periodicity of the periodic structure of the electrode wires. If the periodicity of the pattern formed by the plurality of electrode wires is low, the electrode wire pattern is less likely to be observed as a periodic structure, so an offset between the pixel pattern, which is the pattern defining the pixels, and the electrode wire pattern is less likely to be observed as an offset between two periodic structures. Observation of moiré is consequently suppressed.

In the touch panel described in WO 2014/115831, for example, the first electrode wires and the second electrode wires each have a polygonal line shape in which ridge portions and valley portions are repeated alternately, and a pattern formed by these electrode wires has a repeating structure comprising polygons other than rectangles. The periodicity of such an electrode wire pattern is therefore lower than the periodicity of a grid-shaped electrode wire pattern in which rectangles are arranged.

SUMMARY OF THE INVENTION

The lower the periodicity of the electrode wire pattern, the less likely it is that the electrode wire pattern will be observed as a periodic structure, so the offset between the pixel pattern and the electrode wire pattern is less likely to be observed as an offset between two periodic structures. Observation of moiré is therefore suppressed the lower the periodicity of the electrode wire pattern. For example, if the electrode wires have a polygonal line shape which bends irregularly, it is possible to further reduce the periodicity of the electrode wire pattern in comparison with the pattern described in Patent Document 1 which comprises electrode wires having a regular polygonal line shape. Here and in the following, the term irregularly is in particular also to be understood as randomly.

Meanwhile, when the periodicity of the electrode wire pattern is low, unevenness in brightness etc. is produced within a region in which the electrode wire pattern is positioned, and a phenomenon known as "graininess" may occur, where there is a sense of flickering distributed in a grainy form or screen glare during viewing from a direction facing the operating surface. The difference between the sparsity or density of the electrode wires is believed to be a cause of graininess because of unevenness in the density of the electrode wires within the pattern when the periodicity of the electrode wire pattern is low. If the periodicity of the electrode wire pattern is excessively low, there is thus a deterioration in the quality of images observed on the display device due to graininess. It would therefore be desirable to regulate the extent of the periodicity of the electrode wire pattern while taking account of moiré and graininess.

The object of the present invention is to provide a conductive film, a touch panel and a display device which make it possible to suppress a deterioration in the quality of images observed on the display device. This object is achieved by a conductive film comprising a transparent dielectric layer having a first surface and a second surface which is a surface on the opposite side to the first surface; a plurality of first electrode wires extending in a first direction on the first surface while bending irregularly and also arranged along a second direction orthogonal to the first direction; and a plurality of second electrode wires extending in the second direction on the second surface while bending irregularly and also arranged along the first direction, and in said conductive film, a pattern formed by the plurality of first electrode wires and the plurality of second electrode wires when viewed from a direction facing the first surface constitutes an electrode wire pattern; imaginary electrode wires extending in the first direction while repeatedly bending at a predetermined period and also arranged along the second direction constitute first reference electrode wires, imaginary electrode wires extending in the second direction while repeatedly bending at a predetermined period and also arranged along the first direction constitute second reference electrode wires, and bent portions of the plurality of first reference electrode wires and the plurality of second reference electrode wires face each other in the adjacent reference electrode wires; a pattern in which the plurality of first reference electrode wires and the plurality of second reference electrode wires are laid one over the other constitutes a reference pattern, and the electrode wire pattern is a pattern in which the bent portions of the reference pattern are irregularly displaced in relation to the order of arrangement of the bent portions of the reference electrode wires; in a power spectrum obtained by means of a two-dimensional Fourier transform of each of the electrode wire pattern and the reference pattern, a value obtained by dividing, at predetermined frequency widths, the cumulative value of spectral intensity of each frequency width by said frequency width is a spectral density; and when a spatial frequency of a peak derived from the periodicity of arrangement of an oblique line portion of the electrode wires in the reference pattern is a first spatial frequency, a spatial frequency of a peak appearing in accordance with the magnitude of half of the period of the first reference electrode wires in the reference pattern is a second spatial frequency, a spatial frequency of a peak appearing in accordance with the magnitude of the arrangement interval of the first reference electrode wires in the reference pattern is a third spatial frequency, and a region of frequencies which are equal to or less than the minimum value of a value which is one quarter of the first spatial frequency, the second spatial frequency and the third spatial frequency is a defined frequency region, a first evaluation value, which is a common logarithm of a value obtained by dividing the cumulative value of the spectral density in the defined frequency region of the electrode wire pattern by the cumulative value of the spectral density in the defined frequency region of the reference pattern, is 3.6 or less.

According to the abovementioned configuration, in an electrode wire pattern comprising electrode wires in the shape of irregular bent lines, the periodicity of the pattern is maintained to the extent that the occurrence of intense graininess is suppressed. It is therefore possible to suppress observation of moiré when the electrode wire pattern is laid over a pixel pattern, and it is also possible to suppress observation of graininess. Accordingly, it is possible to suppress a deterioration in the quality of images observed on a display device.

In the abovementioned configuration, the first evaluation value may be 1.0 or greater.

According to the abovementioned configuration, the periodicity causing a periodic structure to be observed in the electrode wire pattern is sufficiently low that moiré is suppressed. Moiré is therefore suitably suppressed when the electrode wire pattern and the pixel pattern are laid one over the other. In particular, when the position of the pattern of the second electrode wires in relation to the pattern of the first electrode wires in the electrode wire pattern is offset from an ideal position, observation of a periodic structure caused by this offset is also suppressed if the first evaluation value is 1.0 or greater, so moiré is correctly suppressed.

In the abovementioned configuration, the proportion of the length of the gap between the adjacent reference electrode wires in relation to the arrangement interval of the reference electrode wires may be between 5% and 10% in the plurality of first reference electrode wires and the plurality of second reference electrode wires.

According to the abovementioned configuration, the gap between the reference electrode wires is not excessively large, so it is possible to suppress observation of moiré resulting from periodicity in the electrode wire pattern attributable to this gap. Furthermore, the abovementioned gap is not excessively small, so it is possible to precisely form the shape in the vicinity of bent portions in the electrode wire pattern which is based on the reference pattern. When the gap between the reference electrode wires satisfies the abovementioned proportion, the first evaluation value functions efficiently as an indicator relating to graininess.

In the abovementioned configuration, in the power spectrum, when a frequency which is half of the first spatial frequency constitutes a fourth spatial frequency, a second evaluation value, which is a common logarithm of a value obtained by dividing the spectral density of the electrode wire pattern at the fourth spatial frequency by the mean value of the spectral density of the electrode wire pattern in the defined frequency region, may be 2.0 or less.

According to the abovementioned configuration, the periodicity of the periodic structure formed when the position of the second electrode wire pattern in relation to the first electrode wire pattern of the electrode wire pattern is offset from an ideal position is kept to a low level. Observation of moiré resulting from this periodicity is therefore suppressed. Consequently, even if this offset is produced in the electrode wire pattern, it is possible to suppress deterioration in the quality of images observed on the display device.

A touch panel for solving the abovementioned problem comprises: the abovementioned conductive film, a cover layer for covering the conductive film, and peripheral circuitry for measuring electrostatic capacity between the electrode wires arranged on the first surface and the electrode wires arranged on the second surface.

According to the abovementioned configuration, a touch panel which suppresses the occurrence of moiré and the occurrence of graininess is achieved.

A display device for solving the abovementioned problem comprises: a display panel having a plurality of pixels arranged in a grid shape to display information, a touch panel which transmits the information displayed by the display panel, and a control unit for controlling driving of the touch panel, and the touch panel is the abovementioned touch panel.

By virtue of the abovementioned configuration, the occurrence of moiré and graininess is suppressed, so it is possible to suppress a deterioration in the quality of images observed.

According to the present invention, it is possible to suppress a deterioration in the quality of images observed on a display device.

According to another aspect of the invention, the invention relates to a conductive film, wherein the conductive film comprises:

a transparent dielectric layer having a first surface and a second surface which is a surface on the opposite side to the first surface;

a plurality of first electrode wires extending in a first direction on the first surface while bending thereby defining first bent portions of the first electrode wires, wherein the first electrode wires are arranged along a second direction orthogonal to the first direction; and a plurality of second electrode wires extending in the second direction on the second surface while bending thereby defining second bent portions of the second electrode wires, wherein the second electrode wires are arranged along the first direction, wherein a pattern formed by the plurality of first electrode wires and the plurality of second electrode wires when viewed from a direction facing the first surface constitutes an electrode wire pattern;

wherein a reference electrode pattern is constituted by a pattern in which a plurality of first reference electrode wires defined by imaginary electrode wires extending in the first direction while repeatedly bending at a predetermined period thereby defining first reference bent portions of the first reference electrode wires, wherein the first reference electrode wires are arranged along the second direction at a first reference interval, and wherein the first reference bent portions of adjacent first reference electrode wires face each other, and a plurality of second reference electrode wires defined by imaginary electrode wires extending in the second direction while repeatedly bending at the predetermined period thereby defining second reference bent portions of the second reference electrode wires, wherein the second reference electrode wires are arranged along the first direction at a second reference interval, and wherein the second reference bent portions of adjacent second reference electrode wires face each other, are laid one over the other;

wherein in the electrode wire pattern the first bent portions of the first electrode wires are randomly displaced in relation to the order of arrangement of the first reference bent portions of the first reference electrode wires and the second bent portions of the second electrode wires are randomly displaced in relation to the order of arrangement of the second reference bent portions of the second reference electrode wires;

wherein a first evaluation value, which is a common logarithm of a value obtained by dividing a cumulative value of a spectral density in a defined frequency region by a cumulative value of a reference spectral density in the defined frequency region, is one of 3.6 and less, wherein the spectral density is calculated from a power spectrum, which is obtained by means of a two-dimensional Fourier transform of the electrode wire pattern, by dividing the power spectrum in ranges of a predetermined frequency width and dividing a cumulative value of a spectral intensity of each range by the predetermined frequency width;

wherein the reference spectral density is calculated from a reference power spectrum, which is obtained by means of a two-dimensional Fourier transform of the reference pattern, by dividing the reference power spectrum in the ranges of the predetermined frequency width and dividing a cumulative value of a reference spectral intensity of each range by the predetermined frequency width; and wherein the defined frequency region is a region of frequencies one of equal and less than a minimum value of a value which is one of a quarter of a first spatial frequency, wherein the first spatial frequency is a spatial frequency of a peak derived from the predetermined period of the bending of the first reference electrode wires and the second reference electrode wires, a second spatial frequency, wherein the second spatial frequency is a spatial frequency of a peak appearing in accordance with the magnitude of the first reference interval of the first reference electrode wires, and a third spatial frequency, wherein the third spatial frequency is a spatial frequency of a peak appearing in accordance with the magnitude of the second reference interval of the second reference electrode wires.

According to yet another aspect of the invention, the invention relates to a conductive film, wherein the conductive film comprises:

a transparent dielectric layer having a first surface and a second surface which is a surface on the opposite side to the first surface;

a plurality of first electrode wires extending in a first direction on the first surface while bending thereby defining first bent portions of the first electrode wires, wherein the first electrode wires are arranged along a second direction orthogonal to the first direction; and a plurality of second electrode wires extending in the second direction on the second surface while bending thereby defining second bent portions of the second electrode wires, wherein the second electrode wires are arranged along the first direction, wherein a pattern formed by the plurality of first electrode wires and the plurality of second electrode wires when viewed from a direction facing the first surface constitutes an electrode wire pattern;

wherein a reference electrode pattern is constituted by a pattern in which a plurality of first reference electrode wires defined by imaginary electrode wires extending in the first direction while repeatedly bending at a predetermined period thereby defining first reference bent portions of the first reference electrode wires, wherein the first reference electrode wires are arranged along the second direction at a first reference interval, and wherein the first reference bent portions of adjacent first reference electrode wires face each other, and a plurality of second reference electrode wires defined by imaginary electrode wires extending in the second direction while repeatedly bending at the predetermined period thereby defining second reference bent portions of the second reference electrode wires, wherein the second reference electrode wires are arranged along the first direction at a second reference interval, and wherein the second reference bent portions of adjacent second reference electrode wires face each other, are laid one over the other;

wherein the first bent portions of the first electrode wires are randomly arranged at positions within a first triangular displacement region surrounding the first reference bent portions; and wherein the second bent portions of the second electrode wires are randomly arranged at positions within a second triangular displacement region surrounding the second reference bent portions.

According to yet another aspect of the invention, the invention relates to a conductive film, wherein the conductive film comprises:

a transparent dielectric layer having a first surface and a second surface which is a surface on the opposite side to the first surface;

a plurality of first electrode wires extending in a first direction on the first surface while irregularly bending thereby defining first bent portions of the first electrode wires, wherein the first electrode wires are arranged along a second direction orthogonal to the first direction; and a plurality of second electrode wires extending in the second direction on the second surface while irregularly bending thereby de-fining second bent portions of the second electrode wires, wherein the second electrode wires are arranged along the first direction, wherein a pattern formed by the plurality of first electrode wires and the plurality of second electrode wires when viewed from a direction facing the first surface constitutes an electrode wire pattern;

wherein a reference electrode pattern comprises
a plurality of first reference wires defined by imaginary electrode wires extending in the first direction while repeatedly bending at a predetermined interval thereby defining first reference bent portions of the first reference wires, wherein the first reference electrode wires are arranged along the second direction at a first reference interval, and wherein the first reference bent portions of adjacent first reference wires face each other, and a plurality of second reference wires defined by imaginary electrode wires extending in the second direction while repeatedly bending at the predetermined interval thereby defining second reference bent portions of the second reference wires, wherein the second imaginary electrode wires are arranged along the first direction at a second reference interval, and wherein the second reference bent portions of adjacent second reference wires face each other, wherein the reference electrode wire pattern is the result, when the plurality of first and second reference wires are laid one over the other.

the first bent portions of the first electrode wires are randomly displaced in relation to the order of arrangement of the first reference bent portions of the first reference electrode wires and the second bent portions of the second electrode wires are randomly displaced in relation to the order of arrangement of the second reference bent portions of the first reference electrode wires;

wherein a first evaluation value, which is a common logarithm of a value obtained by dividing a cumulative value of a spectral density in a defined frequency region for electrode wire pattern by a cumulative value of a reference spectral density in the defined frequency region for reference pattern, is 3.6 or less, wherein the spectral density is calculated from a power spectrum, which is obtained by means of a two-dimensional Fourier trans-form of the electrode wire pattern, by dividing the power spectrum in ranges of a predetermined frequency width and dividing a cumulative value of a spectral intensity of each range by the predetermined frequency width;

wherein the reference spectral density is calculated from a reference power spectrum, which is obtained by means of a two-dimensional Fourier transform of the reference pattern, by dividing the reference power spectrum in the ranges of the predetermined frequency width and dividing a cumulative value of a reference spectral intensity of each range by the predetermined frequency width; and wherein the defined frequency region is a frequency region covering frequencies equal or less than a minimum value of a value which is one of a quarter of a first spatial frequency, wherein the first spatial frequency is a spatial frequency of a peak derived from the predetermined interval of the bending of the first reference electrode wires and the second reference electrode wires, a second spatial frequency, wherein the second spatial frequency is a spatial frequency of a peak appearing in accordance with half the magnitude of the first reference interval of the first reference electrode wires, and a third spatial frequency, wherein the third spatial frequency is a spatial frequency of a peak appearing in accordance with the magnitude of the second reference interval of the second reference electrode wires.

BRIEF DESCRIPTION OF THE DRAWINGS

FIG. 1 is a view in cross section showing the cross-sectional structure of a display device relating to a first mode of embodiment of the display device.

FIG. 2 is a plan view showing the planar structure of a conductive film according to the first mode of embodiment.

FIG. 3 is a plan view showing the pixel arrangement of a display panel according to the first mode of embodiment.

FIG. 4 is a schematic diagram to illustrate the electrical configuration of a touch panel according to the first mode of embodiment.

FIG. 5 shows the configuration of sensing reference electrode wires according to the first mode of embodiment.

FIG. 6 shows the configuration of sensing electrode wires according to the first mode of embodiment.

FIG. 7 shows the configuration of drive reference electrode wires according to the first mode of embodiment.

FIG. 8 shows the configuration of drive electrode wires according to the first mode of embodiment.

FIG. 9 shows the configuration of a reference pattern according to the first mode of embodiment.

FIG. 10 shows the configuration of an electrode wire pattern according to the first mode of embodiment.

FIG. 11 schematically shows a power spectrum obtained by means of a two-dimensional Fourier transform of the reference pattern according to the first mode of embodiment.

FIG. 12 shows the relationship of spatial frequency and spectral density in a power spectrum of the reference pattern according to the first mode of embodiment.

FIG. 13 schematically shows a power spectrum obtained by means of a two-dimensional Fourier transform of the electrode wire pattern according to the first mode of embodiment.

FIG. 14 shows the relationship of spatial frequency and spectral density in a power spectrum of the electrode wire pattern according to the first mode of embodiment.

FIG. 15 shows a power spectrum image of the reference pattern according to the first mode of embodiment.

FIG. 16 shows a power spectrum image of the electrode wire pattern according to the first mode of embodiment.

FIG. 17 schematically shows a power spectrum obtained by means of a two-dimensional Fourier transform of a reference pattern according to a second mode of embodiment, in relation to a second mode of embodiment of the display device.

FIG. 18 shows the relationship of spatial frequency and spectral density in a power spectrum of the reference pattern according to the second mode of embodiment.

FIG. 19 schematically shows a power spectrum obtained by means of a two-dimensional Fourier transform of an electrode wire pattern according to the second mode of embodiment.

FIG. 20 shows the relationship of spatial frequency and spectral density in a power spectrum of the electrode wire pattern according to the second mode of embodiment.

FIG. 21 is a view in cross section showing the cross-sectional structure of a display device according to a variant example.

FIG. 22 is a view in cross section showing the cross-sectional structure of a display device according to a variant example.

DESCRIPTION OF THE PREFERRED EMBODIMENTS

A first mode of embodiment of a conductive film, touch panel and display device will be described with reference to FIG. 1 to FIG. 16. It should be noted that the drawings schematically show the configuration of the conductive film, touch panel and display device in order to illustrate a first mode of embodiment thereof, and the size proportions of each element in the configurations depicted may differ from the actual proportions. The configuration of the display device will be described with reference to FIG. 1.

As shown in FIG. 1, a display device 100 comprises, for example, a lamination in which a display panel 10 which is a liquid crystal panel, and a touch panel 20 are bonded together by means of one transparent adhesion layer which is not depicted, and further comprises a circuit for driving the touch panel 20 and a control unit for controlling driving of the touch panel 20. It should be noted that the above-mentioned transparent adhesion layer may be omitted, provided that the relative positions of the display panel 10 and the touch panel 20 are fixed by another structural element such as an enclosure.

A substantially rectangular display surface is defined on the surface of the display panel 10 and information such as images based on image data is displayed on the display surface.

The structural elements forming the display panel 10 are arranged in the following manner in succession from the structural element furthest from the touch panel 20. That is to say, the following are located in decreasing distance order from the touch panel 20: a lower-side polarizing plate 11, a thin-film transistor (referred to below as TFT) substrate 12, a TFT layer 13, a liquid crystal layer 14, a color filter layer 15, a color filter substrate 16, and an upper-side polarizing plate 17.

Among these components, pixel electrodes forming sub-pixels are positioned in the form of a matrix in the TFT layer 13. Furthermore, a black matrix of the color filter layer 15 has the shape of a grid formed by a plurality of unit cells having a rectangular shape. By virtue of this grid shape, the black matrix defines a plurality of regions having a rectangular shape serving as regions facing each of the sub-pixels, and colored layers for changing white light to light of any color from among red, green and blue are positioned in each region defined by the black matrix.

It should be noted that if the display panel 10 is an EL panel for outputting colored light, comprising a red pixel for outputting red light, a green pixel for outputting green light, and a blue pixel for outputting blue light, then the above-mentioned color filter layer 15 may be omitted. In this case, boundary portions between adjacent pixels of the EL panel function as the black matrix. Furthermore, the display panel 10 may be a plasma panel for emitting light by means of electrical discharge, in which case boundary portions defining a red phosphor layer, a green phosphor layer and a blue phosphor layer function as the black matrix.

The touch panel 20 is an electrostatic-capacitive touch panel and constitutes a laminate in which a conductive film 21 and a cover layer 22 are bonded together by means of a transparent adhesion layer 23, the laminate being light transmissive so as to transmit information displayed by the display panel 10.

Specifically, among the structural elements forming the touch panel 20, the following are positioned in succession from the structural element closest to the touch panel 10: a transparent substrate 31, a plurality of drive electrodes 31DP, a transparent adhesion layer 32, a transparent dielectric substrate 33, a plurality of sensing electrodes 33SP, the transparent adhesion layer 23, and the cover layer 22. Among these, the transparent substrate 31, drive electrodes 31DP, transparent adhesion layer 32, transparent dielectric substrate 33, and sensing electrodes 33SP form the conductive film 21.

The transparent substrate 31 has insulating properties and light transmission properties so as to transmit information such as images displayed by the display surface of the display panel 10, and is placed over the whole of the display surface. The transparent substrate 31 is formed from a base material such as a transparent glass substrate, a transparent resin film, or a silicon substrate, for example. Examples of resins which may be used for the transparent substrate 31 include polyethylene terephthalate (PET), polymethyl methacrylate (PMMA), polypropylene (PP), and polystyrene (PS). The transparent substrate 31 may be a single-layer structure comprising one base material or it may be a multilayer structure in which two or more base materials are stacked.

The surface of the transparent substrate 31 on the opposite side to the display panel 10 is set as a drive electrode surface 31S, and the plurality of drive electrodes 31DP are disposed on the drive electrode surface 31S. The plurality of drive electrodes 31DP and the portions of the drive electrode surface 31S where the drive electrodes 31DP are not positioned are bonded to the transparent dielectric substrate 33 by means of the single transparent adhesion layer 32.

The transparent adhesion layer 32 has light transmission properties so as to transmit the information such as images displayed on the display surface, and a polyether-based adhesive or acrylic adhesive, or the like, is used for the transparent adhesion layer 32, for example.

The transparent dielectric substrate 33 has light transmission properties so as to transmit the information such as images displayed on the display surface, and a dielectric constant suitable for detecting electrostatic capacity between electrodes. The transparent dielectric substrate 33 is formed from a base material such as a transparent glass substrate, a transparent resin film, or a silicon substrate, for example.

Examples of resins which may be used for the transparent dielectric substrate 33 include PET, PMMA, PP and PS. The transparent dielectric substrate 33 may be a single-layer structure comprising one base material or it may be a multilayer structure in which two or more base materials are stacked.

The plurality of drive electrodes 31DP are bonded to the transparent dielectric substrate 33 by means of the transparent adhesion layer 32, and as a result the plurality of drive electrodes 31DP are arranged on a rear surface of the transparent dielectric substrate 33 which is a surface facing the transparent substrate 31.

The surface of the transparent dielectric substrate 33 on the opposite side to the transparent adhesion layer 32 is set as a sensing electrode surface 33S, and the plurality of sensing electrodes 33SP are disposed on the sensing electrode surface 33S. That is to say, the transparent dielectric substrate 33 is interposed between the plurality of drive electrodes 31DP and the plurality of sensing electrodes 33SP. The plurality of sensing electrodes 33SP and the portions of the sensing electrode surface 33S where the sensing electrodes 33SP are not positioned are bonded to the cover layer 22 by means of the single transparent adhesion layer 23.

The transparent adhesion layer 23 has light transmission properties so as to transmit the information such as images displayed on the display surface, and a polyether-based adhesive or acrylic adhesive, or the like, is used for the transparent adhesion layer 23, for example. The type of adhesive used for the transparent adhesion layer 23 may be a wet-lamination adhesive, or it may be a dry-lamination adhesive or hot-lamination adhesive.

The cover layer 22 is formed from a glass substrate such as reinforced glass, or a resin film etc., and the surface of the cover layer 22 on the opposite side to the transparent adhesion layer 23 functions as an operating surface 20S constituting the front surface of the touch panel 20.

It should be noted that among the abovementioned structural elements, the transparent adhesion layer 23 may be omitted. In a configuration in which the transparent adhesion layer 23 is omitted, the surface of the cover layer 22 facing the transparent dielectric substrate 33 should be set as the sensing electrode surface 33S, and the plurality of sensing electrodes 33SP should be formed by patterning of one thin film formed on the sensing electrode surface 33S.

Furthermore, when the touch panel 20 is produced, it is possible to use a method in which the conductive film 21 and the cover layer 22 are bonded by means of the transparent adhesion layer 23, and the following production method may also be used as an example of a method other than said production method. That is to say, a thin-film layer comprising a conductive metal such as copper is formed, directly or with an underlayer interposed, on the cover layer 22 such as a resin film, and a resist layer having the shape of the pattern of the sensing electrodes 33SP is formed on the thin-film layer. The thin-film layer is then processed to the shape of the plurality of sensing electrodes 33SP by means of a wet etching method employing ferric chloride or the like, whereby a first film is obtained. Furthermore, a thin-film layer formed on another resin film functioning as the transparent substrate 31 is processed to the shape of the plurality of drive electrodes 31DP in the same way as the sensing electrodes 33SP, whereby a second film is obtained. The first film and the second film are then bonded by means of the transparent adhesion layers 23, 32 to the transparent dielectric substrate 33 in such a way that the transparent dielectric substrate 33 is interposed therebetween.

The planar structure of the conductive film 21 will be described with reference to FIG. 2, focusing on the positional relationship of the sensing electrodes 33SP and the drive electrodes 31DP. It should be noted that in FIG. 2, the conductive film 21 is seen from a direction facing the front surface of the transparent dielectric substrate 33, and each strip-shaped region extending along a transverse direction bounded by the two-dot chain lines shows a region in which one sensing electrode 33SP is disposed, and each strip-shaped region extending along a longitudinal direction bounded by the two-dot chain lines shows a region in which one drive electrode 31DP is disposed. Moreover, the numbers of sensing electrodes 33SP and drive electrodes 31DP are shown in a simplified form.

Furthermore, in order to simplify understanding of the configuration of the sensing electrodes 33SP and the drive electrodes 31DP, the sensing electrode wires forming the sensing electrodes 33SP are shown only for the sensing electrodes 33SP positioned on the uppermost side of FIG. 2, and the drive electrode wires forming the drive electrodes 31DP are shown only for the drive electrodes 31DP positioned on the far left-hand side of FIG. 2.

As shown in FIG. 2, the plurality of sensing electrodes 33SP on the sensing electrode surface 33S of the transparent dielectric substrate 33 each have the shape of a band extending along a first direction D1 constituting one direction, and are arranged along a second direction D2 orthogonal to the first direction D1. Each of the sensing electrodes 33SP is insulated from another adjacent sensing electrode 33SP.

The sensing electrodes 33SP are formed from a plurality of sensing electrode wires 33SR, and a sensing electrode wire group which is an assembly of a plurality of these sensing electrode wires 33SR is disposed on the sensing electrode surface 33S. A metallic film such as copper, silver or aluminum is used as the material forming the sensing electrode wires 33SR, and the sensing electrode wires 33SR are formed by using etching to pattern the metallic film formed on the sensing electrode surface 33S, for example.

The plurality of sensing electrodes 33SP are each separately connected via a sensing pad 33P to a detection circuit which is an example of peripheral circuitry of the touch panel 20, and a current value is measured by means of the detection circuit. A plurality of sensing electrode wires 33SR connected to one sensing pad 33P constitute sensing electrode wires 33SR forming one sensing electrode 33SP. A plurality of sensing electrode wires 33SR forming one sensing electrode 33SP collaborate to contribute to detection of a change in electrostatic capacity in the region in which that sensing electrode 33SP is positioned.

The plurality of drive electrodes 31DP on the drive electrode surface 31S of the transparent substrate 31 each have the shape of a band extending along the second direction D2 and are arranged along the first direction D1. Each of the drive electrodes 31DP is insulated from another adjacent drive electrode 31DP.

The drive electrodes 31DP are formed from a plurality of drive electrode wires 31DR, and a drive electrode wire group which is an assembly of a plurality of these drive electrode wires 31DR is disposed on the drive electrode surface 31S. A metallic film such as copper, silver or aluminum is used as the material forming the drive electrode wires 31DR, and the drive electrode wires 31DR are formed by using etching to pattern the metallic film formed on the drive electrode surface 31S, for example.

The plurality of drive electrodes 31DP are each separately connected via a drive pad 31P to a selection circuit which is an example of peripheral circuitry of the touch panel 20, and a drive signal output by the selection circuit is received, whereby a drive electrode is selected by the selection circuit. A plurality of drive electrode wires 31DR connected to one drive pad 31P constitute drive electrode wires 31DR forming one drive electrode 31DP. A plurality of drive electrode wires 31DR forming one drive electrode 31DP collaborate to contribute to detection of a change in electrostatic capacity in the region in which that drive electrode 31DP is positioned.

An overlapping portion of the sensing electrodes 33SP and the drive electrodes 31DP, as seen in a plan view facing the front surface of the transparent dielectric substrate 33, constitutes a capacity detector ND having a square shape defined by the two-dot chain lines in FIG. 2. One capacity detector ND constitutes a portion where one sensing electrode 33SP and one drive electrode 31DP intersect in three dimensions, and is the smallest unit of the touch panel 20 enabling detection of a position touched by a finger or the like of the user.

It should be noted that the method for forming the sensing electrode wires 33SR and the drive electrode wires 31DR is not limited to the etching mentioned above, and examples of other methods which may be used include printing methods.

The planar structure of the color filter layer 15 of the display panel 10, in other words the pixel arrangement in the display panel 10, will be described with reference to FIG. 3.

As shown in FIG. 3, a black matrix 15a of the color filter layer 15 has a grid pattern comprising a plurality of unit cells having a rectangular shape arranged along the first direction D1 and the second direction D2. One pixel 15P comprises three unit cells which are continuous along the first direction D1, and the plurality of pixels 15P are arranged in the form of a grid along the first direction D1 and the second direction D2.

Each of the plurality of pixels 15P comprises: a red colored layer 15R for displaying a red color, a green colored layer 15G for displaying a green color, and a blue colored layer 15B for displaying a blue color. The red colored layer 15R, green colored layer 15G and blue colored layer 15B are repeatedly arranged in that order along the first direction D1 of the color filter layer 15, for example. Furthermore, the plurality of red colored layers 15R are arranged continuously along the second direction D2, the plurality of green colored layers 15G are arranged continuously along the second direction D2, and the plurality of blue colored layers 15B are arranged continuously along the second direction D2.

One red colored layer 15R, one green colored layer 15G and one blue colored layer 15B form one pixel 15P, and the plurality of pixels 15P are arranged along the first direction D1 in a state in which the arrangement order of the red colored layer 15R, green colored layer 15G and blue colored layer 15B in the first direction D1 is maintained. Furthermore, in other words the plurality of pixels 15P are disposed in the form of stripes extending along the second direction D2.

The width of a pixel 15P along the first direction D1 is a first pixel width P1, and the width of a pixel 15P along the second direction D2 is a second pixel width P2. The first pixel width P1 and the second pixel width P2 are each set at a value commensurate with the size of the display panel 10 and the required resolution of the display panel 10, among other things.

The electrical configuration of the touch panel 20 will be described together with the function of the control unit of the display device 100, with reference to FIG. 4. It should be noted that the electrical configuration of a mutual-capacitive touch panel 20 will be described below as an example of an electrostatic-capacitive touch panel 20.

As shown in FIG. 4, the touch panel 20 comprises a selection circuit 34 and a detection circuit 35 as peripheral circuitry. The selection circuit 34 is connected to the plurality of drive electrodes 31DP and the detection circuit 35 is connected to the plurality of sensing electrodes 33SP, and a control unit 36 of the display device 100 is connected to the selection circuit 34 and the detection circuit 35.

The control unit 36 generates and outputs a start timing signal for causing the selection circuit 34 to start generating a drive signal for each drive electrode 31DP. The control unit 36 generates and outputs a scan timing signal for causing the selection circuit 34 to successively scan a target drive electrode to which the drive signal is supplied, from a first drive electrode 31DP1 to an $n^{th}$ drive electrode 31DPn.

The control unit 36, comprising one or more processors and associated memory, generates and outputs a start timing signal for causing the detection circuit 35 to start detecting a current flowing through each sensing electrode 33SP. The control unit 36 generates and outputs a scan timing signal for causing the detection circuit 35 to successively scan a detection target sensing electrode, from a first sensing electrode 33SP1 to an $n^{th}$ sensing electrode 33SPn.

The selection circuit 34 starts to generate a drive signal in accordance with the start timing signal output by the control unit 36, and scans the drive signal output destination from the first drive electrode 31DP1 to the $n^{th}$ drive electrode 31DPn in accordance with the scan timing signal output by the control unit 36.

The detection circuit 35 comprises a signal acquisition unit 35a and a signal processing unit 35b. The signal acquisition unit 35a starts to acquire a current signal, which is an analog signal generated by each sensing electrode 33SP, in accordance with the start timing signal output by the control unit 36. The signal acquisition unit 35a then scans an acquisition source of the current signal from the first sensing electrode 33SP1 to the $n^{th}$ sensing electrode 33SPn in accordance with the scan timing signal output by the control unit 36.

The signal processing unit 35b processes each current signal acquired by the signal acquisition unit 35a to generate a voltage signal, which is a digital value, and outputs the generated voltage signal to the control unit 36. In this way, the selection circuit 34 and the detection circuit 35 measure a change in electrostatic capacity between the drive electrodes 31DP and the sensing electrodes 33SP by generating a voltage signal from a current signal which varies according to the change in electrostatic capacity.

The control unit 36 detects a position at which a finger or the like of a user contacts the touch panel 20, in accordance with the voltage signal output by the signal processing unit 35b, and information of the detected position is used for various types of processing such as generating information displayed on the display surface of the display panel 10. It should be noted that the touch panel 20 is not necessarily the abovementioned mutual-capacitive touch panel 20, and it may equally be a self-capacitive touch panel.

The configuration of the electrode wire pattern formed by superimposing the plurality of sensing electrode wires 33SR and the plurality of drive electrode wires 31DR will be described with reference to FIG. 5 to FIG. 10.

In the first mode of embodiment, the respective sensing electrode wires 33SR and drive electrode wires 31DR have the shape of bent lines which are irregularly bent. The pattern formed by the plurality of sensing electrode wires 33SR and the pattern formed by the plurality of drive electrode wires 31DR are produced using a reference pattern formed from regularly bent lines.

A sensing reference pattern forming the basis of the pattern formed by the plurality of sensing electrode wires 33SR will be described with reference to FIG. 5.

As shown in FIG. 5, the sensing reference pattern is formed from a plurality of sensing reference electrode wires 40KR which are imaginary electrode wires having a regular polygonal line shape. The plurality of sensing reference electrode wires 40KR each include two types of reference short-wire portions 40E which are alternately repeated along the first direction D1 and constitute an assembly of two types of reference short-wire portions 40E having a linear shape and having different inclinations, and reference bent portions 40Q which are portions to which the two types of reference short-wire portions 40E are connected. In other words, the sensing reference electrode wires 40KR have a polygonal line shape extending overall in the first direction D1, with the plurality of reference short-wire portions 40E being joined by way of the reference bent portions 40Q. Each of the two types of reference short-wire portions 40E has a length Lk along a direction of extension of the reference short-wire portions 40E. The lengths Lk of the plurality of reference short-wire portions 40E included in the sensing reference pattern are all equal. One reference short-wire portion 40Ea out of the two types of reference short-wire portions 40E has an angle of inclination of $+\theta k$ in relation to a baseline A1 which is an imaginary straight line extending along the first direction D1, while the other reference short-wire portion 40Eb has an angle of inclination of $-\theta k$ in relation to the baseline A1. That is to say, in the plurality of reference short-wire portions 40E included in the sensing reference pattern, the absolute value of the inclination of the reference short-wire portions 40E in relation to the baseline A1 is constant, and in the sensing reference electrode wires 40KR, the reference short-wire portions 40E which have a positive inclination and the reference short-wire portions 40E which have a negative inclination are alternately repeated along the first direction D1.

The angle formed by two adjacent reference short-wire portions 40E along the first direction D1 is a reference angle $\alpha s$, and the reference angles $\alpha s$ in the sensing reference pattern are all equal. Furthermore, the reference angle $\alpha s$ is split equally in two by means of a straight line passing through the reference bent portion 40Q and extending in a direction along the second direction D2.

The plurality of reference bent portions 40Q positioned on one side of the sensing reference electrode wires 40KR in the second direction D2 are positioned on a straight line extending along the first direction D1, and the plurality of reference bent portions 40Q positioned on the other side of the sensing reference electrode wires 40KR in the second direction D2 are also positioned on a straight line extending along the first direction D1. The length between these straight lines, in other words the length along the second direction D2 between the reference bent portions 40Q positioned on the first-mentioned side in the second direction D2 and the reference bent portions 40Q positioned on the other side in the second direction D2, is a reference width Hs. In other words, the reference width Hs is the width occupied by one sensing reference electrode wire in the second direction D2, i.e. the length of one reference short-wire portion 40E along the second direction D2. The reference width Hs is constant in the sensing reference pattern.

A reference half period Ws is the length along the first direction D1 between two reference bent portions 40Q arranged along the sensing reference electrode wires 40KR. In other words, the reference half period Ws is the length along the first direction D1 of one reference short-wire portion 40E, and the reference half period Ws is constant in the sensing reference pattern. The length between adjacent reference bent portions 40Q along the first direction D1 of the sensing reference electrode wires 40KR is a length which is twice the reference half period Ws, and this length which is twice the reference half period Ws constitutes the length of one repeat period of bending in the sensing reference electrode wires 40KR.

In the abovementioned configuration, in other words, the plurality of reference bent portions 40Q comprise the ridge portions in the drawing which are an example of first imaginary bent portions, and the valley portions in the drawing which are an example of second imaginary bent portions, the first imaginary bent portions and the second imaginary bent portions being arranged one each alternating periodically along the sensing reference electrode wires 40KR. The plurality of first imaginary bent portions and the plurality of second imaginary bent portions are positioned on separate straight lines extending along the first direction D1.

The plurality of sensing reference electrode wires 40KR are arranged along the second direction D2 with a phase offset in the first direction D1. That is to say, the sensing reference electrode wires 40KR adjacent to each other along the second direction D2 are such that portions thereof arranged along the second direction D2 have different phases. The phases constitute a position in the first direction D1 within one period of the sensing reference electrode wires 40KR, for example, the position of a portion from a reference bent portion 40Q which is a valley portion to a reference bent portion 40Q which is a valley portion adjacent to that reference bent portion 40Q along the first direction D1.

To describe this in detail, the portions of adjacent sensing reference electrode wires 40KR arranged along the second direction D2 have opposite phases. In other words, the phases of adjacent sensing reference electrode wires 40KR are reversed. For example, if the distance between valley portions constitutes one period, then, in a central portion of a region S1 shown in FIG. 5, the phase of the sensing reference electrode wire 40KR on the upper side of the drawing corresponds to the start position of one period, and the phase of the sensing reference electrode wire 40KR on the lower side of the drawing corresponds to a position which is half of one period. In such a configuration, a reference bent portion 40Q which is a ridge portion and a reference bent portion 40Q which is a valley portion are alternately arranged in the second direction D2, and furthermore, a reference short-wire portion 40Ea and a reference short-wire portion 40Eb are alternately arranged. In other words, the reference bent portions 40Q of adjacent sensing reference electrode wires 40KR face each other.

The plurality of sensing reference electrode wires 40KR are arranged with a constant arrangement interval along the second direction D2, and this arrangement interval is a reference interval Ps. That is to say, the reference interval Ps is the distance along the second direction D2 between reference bent portions 40Q of adjacent sensing reference electrode wires 40KR constituting first imaginary bent portions, or between reference bent portions 40Q constituting second imaginary bent portions.

The length of the gap between adjacent sensing reference electrode wires 40KR along the second direction D2 is an inter-electrode wire gap Gs. In other words, the inter-electrode wire gap Gs is the distance along the second direction D2 between two facing reference bent portions 40Q of adjacent sensing reference electrode wires 40KR, which is to say between a first imaginary bent portion of one sensing reference electrode wire 40KR and a second imaginary bent portion of another sensing reference electrode wire 40KR.

If the inter-electrode wire gap Gs is excessively large, then moiré is likely to occur when an electrode wire pattern produced on the basis of the sensing reference pattern is placed over a pixel pattern, due to the fact that periodicity is produced as a result of the inter-electrode wire gap Gs. On the other hand, if the inter-electrode wire gap Gs is excessively small, then it is difficult to precisely form the vicinity of the bent portions of the electrode wires in the electrode wire pattern. When the electrode wires are formed by etching of a metallic thin film in particular, the widths of the electrode wires are greater than the design dimensions in sections where bent portions are close to each other, and the vicinity of the bent portions is likely to be observed as a point.

From this point of view, if the percentage of the inter-electrode wire gap Gs in relation to the reference interval Ps is a gap proportion Rg, then this gap proportion Rg is preferably between 0% and 25%, and more preferably between 5% and 10%.

The abovementioned parameters defining the shape of the sensing reference pattern are preferably set, using Fourier analysis, to values at which the generation of moiré is suppressed when the sensing reference pattern and the pixel pattern of the display panel 10 are superimposed one over the other. Specifically, the contrast of moiré occurring when the sensing reference pattern is superimposed on a pixel pattern having a predetermined period, and the pitch and angle of stripes observed as moiré are calculated, and the value of each parameter is set in such a way that moiré is unlikely to be observed. At this time, it is preferable to obtain parameter values with which the generation of moiré can be suppressed across pixel patterns of a plurality of display panels 10 having different sizes and different resolutions. The plurality of display panels 10 for superimposition should include at least two types of display panel having different sizes or two types of display panel having different resolutions.

In the Fourier analysis, frequency information is acquired by performing a Fourier transform of the patterns to be superimposed, a convolution of the resulting two-dimensional Fourier pattern is calculated, after which a two-dimensional mask is applied, and an image is reconstructed by means of an inverse Fourier transform. Since the pitch of the moiré is greater than the period of the original patterns which are superimposed, the two-dimensional mask should be applied in such a way that high-frequency components are removed by the two-dimensional mask, and only low-frequency components are extracted. Setting the size of the mask to a size determined in accordance with human visual response characteristics makes it possible, after the image has been reconstructed, to determine the degree of observed moiré, based on a calculation of the contrast, pitch and angle of the moiré.

Furthermore, the reference interval Ps is preferably set in a range of between 10% and 600% of the first pixel width P1 and the second pixel width P2 in the display panel 10. If the first pixel width P1 and the second pixel width P2 are different, the range should be based on the larger of the first pixel width P1 and the second pixel width P2. If the reference interval Ps is equal to or greater than 10% of the first pixel width P1 and the second pixel width P2, the proportion occupied by the electrode wires in the electrode wire pattern produced on the basis of the sensing reference pattern does not become excessive, so a reduction in the transmittance of light in the touch panel 20 can be suppressed. Meanwhile, if the reference interval Ps is equal to or less than 600% of the first pixel width P1 and the second pixel width P2, this improves the accuracy in detecting a position on the touch panel 20.

Furthermore, the reference angle $\alpha s$ is preferably between 95° and 150°, and more preferably between 100° and 140°. If the reference angle $\alpha s$ is equal to or greater than 95°, it is possible to suppress an increase in the number of reference short-wire portions 40E which would make the proportion of electrode wires occupying the pattern excessive. Meanwhile, if the reference angle $\alpha s$ is equal to or less than 150°, the reference half period Ws is maintained in a range which is not excessively large, so it is a simple matter to set the reference interval Ps and the reference width Hs to values within a suitable range.

A pattern of the sensing electrode wires 33SR produced on the basis of the sensing reference pattern will be described with reference to FIG. 6.

As shown in FIG. 6, the pattern formed by the plurality of sensing electrode wires 33SR is a pattern in which the positions of the reference bent portions 40Q in the plurality of sensing reference electrode wires 40KR are irregularly displaced. In FIG. 6, the sensing reference electrode wires 40KR are denoted by narrow lines, and the sensing electrode wires 33SR are denoted by thick lines.

Bent portions 33Q of the sensing electrode wires 33SR are arranged at positions where the positions of the reference bent portions 40Q of the sensing reference electrode wires 40KR are moved within a triangular displacement region Ss surrounding the reference bent portions 40Q. One sensing electrode wire 33SR has a shape in which the position of each reference bent portion 40Q in one sensing reference electrode wire 40KR is irregularly displaced in relation to the order of arrangement of the reference bent portions 40Q within the displacement region Ss of each reference bent portion 40Q. A pattern comprising the plurality of sensing electrode wires 33SR is formed by irregularly displacing the position of each reference bent portion 40Q in the plurality of sensing reference electrode wires 40KR in relation to the order of arrangement of the reference bent portions 40Q in each sensing reference electrode wire 40KR.

The displacement region Ss has the shape of an isosceles triangle with a base Bk extending along the first direction D1, and is disposed in such a way that the base Bk is directed towards the outside of the sensing reference electrode wire 40KR, and a straight line extending along the second direction D2 through the reference bent portion 40Q passes through the apex of the isosceles triangle and the center of the base Bk. The base Bk is disposed in the center between adjacent sensing reference electrode wires 40KR along the second direction D2. The base Bk is shared between a displacement region Ss set in relation to the reference bent portion 40Q of one sensing reference electrode wire 40KR and a displacement region Ss set in relation to a reference bent portion 40Q of another sensing reference electrode wire 40KR facing the abovementioned reference bent portion 40Q. That is to say, the base Bk of the displacement region Ss is arranged at a position separated from a central position of the sensing reference electrode wire 40KR in the second direction D2 by half of the length of the reference interval Ps in the second direction D2.

The height ds1 of the triangle constituting the displacement region Ss and the length ds2 of the base Bk are set in such a way that the ratio of the height ds1 to the reference interval Ps is the same as the ratio of the length ds2 to a length which is twice the reference half period Ws. The ratio of the height ds1 to the reference interval Ps is a displacement rate Rs. The greater the displacement rate Rs, the larger the displacement region Ss, in other words, the range of displacement of the bent portions 33Q in relation to the reference bent portions 40Q increases. Consequently, the greater the displacement rate Rs, the more the regularity of the sensing electrode wires 33SR is broken down and the lower the periodicity of the pattern of the sensing electrode wires 33SR.

The sensing electrode wires 33SR produced in this way have a polygonal line shape extending in the first direction D1 while repeatedly bending in an irregular manner. To describe this in detail, the sensing electrode wires 33SR include a plurality of the bent portions 33Q, and a plurality of short-wire portions 33E having a linear shape joining adjacent bent portions 33Q along the sensing electrode wires 33SR. The bent portions 33Q are portions where two adjacent short-wire portions 33E are connected, and a bent portion 33Q corresponding to a ridge portion in the drawing which is an example of a first bent portion, and a bent portion 33Q corresponding to a valley portion in the drawing which is an example of a second bent portion are arranged alternately one each along the sensing electrode wires 33SR. The bent portions 33Q are disposed at positions where the reference bent portions 40Q of the sensing reference electrode wires 40KR are displaced within the displacement region Ss, and the short-wire portions 33E are located at positions joining these bent portions 33Q.

Each of the plurality of short-wire portions 33E has a length Ls along a direction of extension of the short-wire portions 33E, and the plurality of short-wire portions 33E include short-wire portions 33E having different lengths Ls. That is to say, the length Ls is not constant among the plurality of short-wire portions 33E. The length Ls varies irregularly in relation to the order of arrangement of the short-wire portions 33E among the plurality of short-wire portions 33E arranged along the first direction D1. Each of the plurality of short-wire portions 33E has an inclination θs to the baseline A1, and the plurality of short-wire portions 33E include short-wire portions 33E having different magnitudes of inclination θs. That is to say, the absolute value of the inclination θs is not constant among the plurality of short-wire portions 33E. The absolute value of the inclination θs varies irregularly in relation to the order of arrangement of the short-wire portions 33E among the plurality of short-wire portions 33E arranged along the first direction D1.

A drive reference pattern forming the basis of a pattern formed by the plurality of drive electrode wires 31DR, and the pattern of the drive electrode wires 31DR produced on the basis of the drive reference pattern will be described with reference to FIG. 7 and FIG. 8. The drive reference pattern also comprises imaginary electrode wires having a regular polygonal line shape, in the same way as the sensing reference pattern, and the pattern of the drive electrode wires 31DR is produced by displacing the bent portions of the drive reference pattern.

As shown in FIG. 7, drive reference electrode wires 41KR which are imaginary electrode wires forming the drive reference pattern include two types of reference short-wire portions 41E which are alternately repeated along the second direction D2, and reference bent portions 41Q which are portions where the two types of reference short-wire portions 41E are connected. The length of the reference short-wire portions 41E included in the drive reference pattern is constant. In the two types of reference short-wire portions 41E, one of the reference short-wire portions 41E has a positive inclination to a baseline A2 which is an imaginary straight line extending along the second direction D2, while the other reference short-wire portion 41E has a negative inclination to the baseline A2, and the absolute values of these inclinations are equal. The reference bent portions 41Q positioned on one side of the drive reference electrode wires 41KR in the first direction D1 and the reference bent portions 41Q positioned on the other side are positioned on separate straight lines extending along the second direction D2.

In the drive reference electrode wires 41KR, the angle formed by two adjacent reference short-wire portions 41E is a reference angle αd, and the length along the first direction D1 between the reference bent portions 41Q positioned on the first-mentioned side of the drive reference electrode wires 41KR in the first direction D1 and the reference bent portions 41Q positioned on the other side in the first direction D1 is a reference width Hd. The length along the second direction D2 between two reference bent portions 41Q arranged along the drive reference electrode wires 41KR is a reference half period Wd. In the drive reference electrode wires 41KR, the length between adjacent reference bent portions 41Q in the second direction D2 is a length which is twice the reference half period Wd, and this length which is twice the reference half period Wd constitutes the length of one repeat period of bending in the drive reference electrode wires 41KR. The reference angle αd, the reference width Hd and the reference half period Wd are all constant in the drive reference pattern.

The plurality of drive reference electrode wires 41KR are arranged at a reference interval Pd which is a constant arrangement interval along the first direction D1. The plurality of drive reference electrode wires 41KR are arranged along the first direction D1 with a phase offset in the second direction D2. The phases constitute a position in the second direction D2 within one period of the drive reference electrode wires 41KR. To describe this in detail, the portions of adjacent drive reference electrode wires 41KR arranged along the first direction D1 have opposite phases, and the reference bent portions 41Q of these electrode wires face each other.

The length of the gap between adjacent drive reference electrode wires 41KR along the first direction D1 is an inter-electrode wire gap Gd. The inter-electrode wire gap Gd is set in such a way that a gap proportion, which is the percentage of the inter-electrode wire gap Gd in relation to the reference interval Pd, is the same as the gap proportion Rg in the sensing reference pattern. That is to say, the gap proportion in both the sensing reference pattern and the drive reference pattern is the predetermined gap proportion Rg.

Here, regarding the reference half periods Ws, Wd and the reference intervals Ps, Pd, the reference half period Ws of the sensing reference electrode wires 40KR is the same as the reference interval Pd of the drive reference electrode wires 41KR (Ws=Pd), and the reference half period Wd of the drive reference electrode wires 41KR is the same as the reference interval Ps of the sensing reference electrode wires 40KR (Wd=Ps). It should be noted that when the reference half periods Ws, Wd and the reference intervals Ps, Pd are set in this way, the reference angle αs of the sensing reference electrode wires 40KR and/or the reference angle αd of the drive reference electrode wires 41KR should be included in the range indicated above as the preferred range of the reference angle αs.

As shown in FIG. 8, the pattern formed by the plurality of drive electrode wires 31DR is a pattern in which the positions of the reference bent portions 41Q of the plurality of drive reference electrode wires 41KR are irregularly displaced. In FIG. 8, the drive reference electrode wires 41KR are denoted by narrow lines, and the drive electrode wires 31DR are denoted by thick lines.

Bent portions 31Q of the drive electrode wires 31DR are arranged at positions where the positions of the reference bent portions 41Q of the drive reference electrode wires 41KR are moved within a triangular displacement region Sd surrounding the reference bent portions 41Q. One drive electrode wire 31DR has a shape in which the position of each reference bent portion 41Q in one drive reference electrode wire 41KR is irregularly displaced in relation to the order of arrangement of the reference bent portions 41Q within the displacement region Sd of each reference bent portion 41Q. The displacement region Sd has the shape of an isosceles triangle with a base extending along the second direction D2, and is disposed in such a way that the base is directed towards the outside of the drive reference electrode wire 41KR, and a straight line extending along the first direction D1 through the reference bent portion 41Q passes through the apex of the isosceles triangle and the center of the base. The base is disposed in the center between adjacent drive reference electrode wires 41KR along the first direction D1.

The height dd1 of the triangle constituting the displacement region Sd and the length dd2 of the base are set in such a way that the ratio of the height dd1 to the reference interval Pd is the same as the ratio of the length dd2 to a length which is twice the reference half period Wd. The ratio of the height dd1 to the reference interval Pd is a displacement rate Rd, and the displacement rate Rd is the same as the displacement rate Rs.

The drive electrode wires 31DR produced in this way include the plurality of bent portions 31Q, and a plurality of short-wire portions 31E having a linear shape joining adjacent bent portions 31Q along the drive electrode wires 31DR. The bent portions 31Q are disposed at positions where the reference bent portions 41Q of the drive reference electrode wires 41KR are displaced within the displacement region Sd, and the short-wire portions 31E are located at positions joining the bent portions 31Q.

In each drive electrode wire 31DR, the length along a direction of extension of the short-wire portions 31E varies irregularly in relation to the order of arrangement of the short-wire portions 31E among the plurality of short-wire portions 31E arranged along the second direction D2. Furthermore, in each drive electrode wire 31DR, the absolute value of the inclination of the short-wire portions 31E to the baseline A2 varies irregularly in relation to the order of arrangement of the short-wire portions 31E among the plurality of short-wire portions 31E arranged along the second direction D2.

An electrode wire pattern formed by superimposing the plurality of sensing electrode wires 33SR and a plurality of drive electrode wires 31DR will be described with reference to FIG. 9 and FIG. 10.

An electrode wire pattern is formed in the conductive film 21, this pattern being obtained by superimposing a pattern formed by the plurality of sensing electrode wires 33SR and a pattern formed by the plurality of drive electrode wires 31DR, as seen from a direction facing the front surface of the transparent dielectric substrate 33. Here, these electrode wires are superimposed in such a way that the direction of extension of the sensing electrodes 33SP and the direction of extension of the drive electrodes 31DP are orthogonal. This electrode wire pattern constitutes a pattern in which the bent portions are irregularly displaced in relation to the reference pattern which constitutes a pattern in which the sensing reference pattern and the drive reference pattern are superimposed in such a way that the first direction D1 and the second direction D2 are orthogonal.

FIG. 9 shows the reference pattern. When Ws=Pd and Wd=Ps, the arrangement of the sensing reference electrode wires 40KR in relation to the drive reference electrode wires 41KR, in other words the position of the reference bent portions 40Q or reference short-wire portions 40E in relation to the reference bent portions 41Q or the reference short-wire portions 41E, is constant within the reference pattern. This means that it is possible to enhance the uniformity of the density of arrangement of the electrode wires in the reference pattern, and it is thus possible to suppress excessive nonuniformity in the density of arrangement of the electrode wires within the electrode wire pattern.

Specifically, as shown in FIG. 9, the reference bent portions 40Q of the sensing reference electrode wires 40KR in the reference pattern lie over the gaps between adjacent drive reference electrode wires 41KR in a central portion between these electrode wires. Furthermore, the reference bent portions 41Q of the drive reference electrode wires 41KR lie over the gaps between adjacent sensing reference electrode wires 40KR in a central portion between these electrode wires. The midpoint of the reference short-wire portions 40E of the sensing reference electrode wires 40KR then intersects the midpoint of the reference short-wire portions 41E of the drive reference electrode wires 40KR.

FIG. 10 is an electrode wire pattern produced on the basis of the reference pattern shown in FIG. 9. The electrode wire pattern according to this mode of embodiment is formed from polygons other than rectangles so the pattern has lower periodicity than a pattern in which rectangles having the same shape are repeated, as is the case with a pattern in which electrode wires extending linearly intersect. Accordingly, the offset between the pixel pattern and the electrode wire pattern is unlikely to be observed as an offset of two periodic structures, and therefore when the electrode wire pattern according to this mode of embodiment is superimposed on the pixel pattern of the display panel 10, observation of moiré is suppressed. As a result, it is possible to suppress a deterioration in the quality of images observed on the display device 100.

In particular, the sensing electrode wires 33SR and the drive electrode wires 31DR forming the electrode wire pattern each have an irregular bent-line shape, so the pattern has lower periodicity than a pattern which is formed from electrode wires having a regular bent-line shape. It is therefore possible to more advantageously suppress observation of moiré when the electrode wire pattern is superimposed on the pixel pattern.

Furthermore, the shape of the sensing reference electrode wires 40KR and the drive reference electrode wires 41KR in the reference pattern is a shape with which moiré is readily suppressed, because parameters such as the reference angles αs, αd and the reference half periods Ws, Wd are set at values at which moiré is unlikely to occur. The periodicity of this reference pattern which readily suppresses moiré is broken down, and as a result the electrode wire pattern forms a pattern which even further suppresses observation of moiré.

Furthermore, in the reference pattern, the phase of adjacent electrode wires is offset, and as a result reference short-wire portions 40E, 41E having the same inclination are not arranged alongside each other in the first direction D1 or the second direction D2, and it is also possible to suppress arrangement of oblique line portions having the same inclination alongside each other in the electrode wire pattern produced on the basis of the reference pattern. When oblique line portions having the same inclination are arranged alongside each other, strip-shaped regions formed by these oblique line portions extend in the direction of arrangement of the electrode wires, and in addition, when two types of strip-shaped regions in which the inclinations of oblique line portions are different are alternately arranged alongside each other, a strip-shaped pattern may be observed as a result of reflection of external light when the display device 100 is not switched on.

In this mode of embodiment, arrangement of oblique line portions having the same inclination alongside each other is suppressed, so observation of such a strip-shaped pattern is suppressed, and as a result it is possible to suppress a deterioration in the quality of the external appearance of the touch panel 20 seen from the operating surface 20S.

The relationship between the periodicity of the electrode wire pattern according to this mode of embodiment and the occurrence of graininess will be discussed with reference to FIG. 11 to FIG. 16, using the results of analysis by means of fast Fourier transformation (FFT).

FIG. 11 is a diagram schematically showing an example of a power spectrum obtained by means of a two-dimensional Fourier transform of the reference pattern, i.e., a pattern in which the sensing reference electrode wires 40KR are superimposed on the drive reference electrode wires 41KR, where the first direction D1 is the horizontal direction and the second direction D2 is the vertical direction. FIG. 11 shows characteristic peaks highlighted, and weak points having a low correlation with the reference pattern are omitted. It should be noted that FIG. 15 shows an image of the actual power spectrum in regard to an example of the reference pattern.

As shown in FIG. 11, bright spots G1 showing a peak in a frequency component derived from the periodicity of the arrangement of the reference short-wire portions 40E, 41E in the reference pattern, in other words the arrangement of the oblique line portions of polygonal lines, can be seen in a two-dimensional frequency space. A spatial frequency corresponding to the bright spots G1 is a first spatial frequency fs. The bright spots G1 can be seen symmetrically about a u axis which is a horizontal axis, and a v axis which is a vertical axis, and the direction in which the bright spots G1 appear in relation to the origin is determined in accordance with the size of the reference angles αs, αd.

Furthermore, bright spots G2, G3 showing a peak in a frequency component derived from the periodicity of the arrangement of the reference bent portions 40Q, 41Q in the reference pattern, in other words the arrangement of the vertex portions of polygonal lines, can be seen on the u axis and on the v axis. Of these, the bright spots G2 are positioned on the u axis and a spatial frequency corresponding to the bright spots G2 is a second spatial frequency fw. The bright spots G2 can be seen symmetrically about the origin, and the positions of the bright spots G2 are determined in accordance with the size of the reference half period Ws, in other words the size of the reference interval Pd. Furthermore, the bright spots G3 are positioned on the v axis, and a spatial frequency corresponding to the bright spots G3 is a third spatial frequency fp. The bright spots G3 can be seen symmetrically about the origin, and the positions of the bright spots G3 are determined in accordance with the size of the reference interval Ps, in other words the size of the reference half period Wd.

Furthermore, bright spots G4 showing a peak in a high-order component can be seen in the direction in which the bright spots G1 appear. The bright spots G4 can be seen at positions corresponding to an integer multiple of the first spatial frequency fs.

FIG. 12 quantitatively shows the spectral intensity of each spatial frequency in the power spectrum of the reference pattern. To describe this in detail, the horizontal axis of the graph shown in FIG. 12 denotes the spatial frequency while the vertical axis denotes a common logarithm value of the spectral density.

The spectral density is a measure indicating the intensity of the spectrum at predetermined frequency widths. The method for calculating the spectral density will be described below. The spatial frequency indicated in the power spectrum is first of all divided into very small predetermined ranges. These ranges are unit frequency widths. The spectral intensity at the spatial frequency included in each range is then added together for each unit frequency width. The cumulative value of the spectral intensity of each unit frequency width is divided by the size of the unit frequency width, whereby the spectral density of each unit frequency width is obtained. The size of the unit frequency width is the width of the value of the spatial frequency included in one range. FIG. 12 shows an approximated curve of points plotting a common logarithm of the spectral density in each unit frequency width.

As shown in FIG. 12, projecting peaks are formed in regard to the spatial frequencies fw, fp, fs corresponding to the bright spots G1, G2, G3 which can be seen in the power spectrum in FIG. 11, and a spatial frequency fs2 corresponding to a high-order component. The peaks of the second spatial frequency fw and the third spatial frequency fp are smaller than the peak of the first spatial frequency fs.

FIG. 13 is a diagram schematically showing an example of a power spectrum obtained by means of a two-dimensional Fourier transform of the electrode wire pattern according to this mode of embodiment, i.e., a pattern in which the sensing electrode wires 33SR are superimposed on the drive electrode wires 31DR, where the first direction D1 is the horizontal direction and the second direction D2 is the vertical direction. It should be noted that FIG. 16 shows an image of the actual power spectrum in regard to an example of the electrode wire pattern.

As shown in FIG. 13, the power spectrum of the electrode wire pattern shows a large number of points distributed in a strip shape, due to the fact that the periodicity of the electrode wire pattern is lower than in the reference pattern because of displacement of the bent portions. The regions where these points are distributed in a strip shape spread from the origin up to the vicinity of the positions where the bright spots G2, G3 can be seen, and also extend to a high-frequency region in a direction centered on the direction in which the bright spots G1 can be seen.

FIG. 14 relates to the power spectrum of the electrode wire pattern, where the relationship between the spatial frequency and the spectral density is shown by the solid line, and relates to the power spectrum of the reference pattern, where the relationship between the spatial frequency and the spectral density is shown by the single-dot chain line, in accordance with the same method as in FIG. 12. The spectral density is depicted using the common logarithm, in the same way as in FIG. 12.

As shown in FIG. 14, in the electrode wire pattern, the peaks are scattered and attenuation and extinction of projecting peaks is produced in comparison with the reference pattern. In particular, there is a large difference between the electrode wire pattern and the reference pattern in the low-frequency region, and peaks corresponding to the spatial frequencies fw, fp in the electrode wire pattern are embedded in the scattered peaks.

The fact that projecting peaks are not observed and the magnitude of the spectral density is higher overall in the low-frequency region in the electrode wire pattern shows that various types of scattered peaks are mixed in that region, rather than there being a single peak. This shows that in the electrode wire pattern, the appearance of a specific periodic structure at a low-frequency, in other words a frequency of high visibility, is suppressed, but there is an increase in elements causing the appearance of unevenness such that haze is produced in the electrode wire pattern, in other words graininess is produced. Accordingly, when there is an excessively large increase in the spectral density in the low-frequency region of the electrode wire pattern, as compared with the reference pattern, moiré is unlikely to be generated but graininess is likely to be strongly observed.

In order to suppress a deterioration in the quality of images observed on the display device 100 by reducing moiré and graininess, the inventors of this application introduced a first evaluation value Ev1, which will be described below, as a parameter for evaluating whether a pattern is permitted as the electrode wire pattern in terms of the extent to which the reference pattern can be broken down in that pattern, in other words, for evaluating the permitted extent of increase in the spectral density in the low-frequency region.

A defined frequency region used in the calculation of the first evaluation value Ev1 will be described first of all. The defined frequency region is a region of frequencies which are equal to or less than the minimum value of three frequency values, namely a spatial frequency fq which is a value that is one quarter of the first spatial frequency fs, the second spatial frequency fw, and the third spatial frequency fp. For example, the region of frequencies which are equal to or less than the spatial frequency fq is the defined frequency region in FIG. 14.

The first evaluation value Ev1 is the common logarithm of a value obtained by dividing the cumulative value of the spectral density in the defined frequency region of the electrode wire pattern by the cumulative value of the spectral density in the defined frequency region of the reference pattern. That is to say, the first evaluation value Ev1 is the common logarithm of the ratio of the spectral density in the defined frequency region of the electrode wire pattern to that of the reference pattern. The cumulative value of the spectral density is obtained as the total of the spectral densities of each unit frequency width, for example.

Experimental results relating to the relationship between the first evaluation value Ev1 and the extent of the occurrence of graininess will be described with reference to table 1. Table 1 shows the results of an evaluation of the extent of the occurrence of graininess in regard to a plurality of electrode wire patterns produced while varying the displacement rate Rs. In the reference pattern used for producing the electrode wire pattern, the reference half period Ws and the reference interval Pd which is the same as the reference half period Ws are predetermined values included in a range of between 250 μm and 350 μm, and the reference interval Ps and the reference half period Wd which is the same as the reference interval Ps are predetermined values included in a range of between 150 μm and 250 μm. It should be noted that the first evaluation value Ev1 in table 1 is calculated using the electrode wire pattern and the reference pattern forming the basis of that electrode wire pattern, and is expressed as a value rounded to below two decimal places.

The evaluation of graininess was carried out by means of visual observation. In the graininess evaluation, the intensity of the graininess was divided into four stages, and where graininess was not observed, this was denoted "⊙", where weak graininess was observed, this was denoted "○", where moderate graininess was observed, this was denoted "Δ", and where intense graininess was observed, this was denoted "X". It should be noted that graininess being observed means that there is a sense of flickering distributed in a grainy form in the region in which the pattern is positioned, or glare is apparent in that region.

TABLE 1

| Gap proportion Rg | Displacement rate Rs | First evaluation value Ev1 | Graininess evaluation |
|---|---|---|---|
| 0% | 0 | 0 | ⊙ |
| | 0.1 | 2.0 | ⊙ |
| | 0.2 | 2.6 | ⊙ |
| | 0.3 | 2.9 | ⊙ |
| | 0.4 | 3.3 | ⊙ |
| | 0.5 | 3.4 | ○ |
| | 0.6 | 3.6 | Δ |
| | 0.7 | 3.7 | X |
| | 0.8 | 3.7 | X |
| | 0.9 | 4.0 | X |
| | 1.0 | 4.1 | X |
| 5% | 0 | 0 | ⊙ |
| | 0.1 | 2.2 | ⊙ |
| | 0.2 | 2.6 | ⊙ |
| | 0.3 | 3.0 | ⊙ |
| | 0.4 | 3.2 | ⊙ |
| | 0.5 | 3.2 | ○ |
| | 0.6 | 3.5 | Δ |
| | 0.7 | 3.6 | Δ |
| | 0.8 | 3.7 | X |
| | 0.9 | 3.8 | X |
| | 1.0 | 4.1 | X |
| 10% | 0 | 0 | ⊙ |
| | 0.1 | 1.7 | ⊙ |
| | 0.2 | 2.2 | ⊙ |
| | 0.3 | 2.8 | ⊙ |
| | 0.4 | 3.1 | ○ |
| | 0.5 | 3.2 | Δ |
| | 0.6 | 3.3 | Δ |
| | 0.7 | 3.5 | Δ |
| | 0.8 | 3.6 | Δ |
| | 0.9 | 3.7 | X |
| | 1.0 | 3.7 | X |
| 25% | 0 | 0 | ⊙ |
| | 0.1 | 1.0 | ⊙ |
| | 0.2 | 1.5 | ⊙ |
| | 0.3 | 1.9 | ○ |
| | 0.4 | 2.2 | Δ |
| | 0.5 | 2.5 | Δ |
| | 0.6 | 2.7 | Δ |
| | 0.7 | 2.5 | Δ |
| | 0.8 | 2.9 | Δ |
| | 0.9 | 2.9 | Δ |
| | 1.0 | 3.2 | Δ |

As shown in table 1, intense graininess is not observed in electrode wire patterns in which the first evaluation value Ev1 is equal to or less than 3.6 That is to say, if the first evaluation value Ev1 is equal to or less than 3.6, the occurrence of graininess is suppressed. Furthermore, a tendency for the value of the first evaluation value Ev1 at which graininess is weakened to increase is confirmed the smaller the gap proportion Rg, in other words the smaller the inter-electrode wire gap Gs, Gd. This is believed to be because as the inter-electrode wire gap Gs, Gd increases, a peak derived from the periodicity due to the inter-electrode wire gap Gs, Gd becomes greater in the reference pattern, and as a result the difference between the cumulative values of the spectral density in the low-frequency region in the reference pattern and the electrode wire pattern decreases.

When the displacement rate Rs varies from 0 to 1.0 in a range of between 5% and 10%, which is the preferred range of the gap proportion Rg, the first evaluation value Ev1 is around 0 to 4. When the first evaluation value Ev1 is in this range, the first evaluation value Ev1 functions particularly effectively as an indicator relating to graininess, when a configuration is adopted to determine the quality of the electrode wire pattern by means of the first evaluation value Ev1 using 3.6 as a threshold.

Furthermore, in order to suppress moiré, a periodic structure is preferably less likely to be observed in the electrode wire pattern than in the reference pattern, in other words the cumulative value of the spectral density in the low-frequency region is preferably suitably large. From this point of view the first evaluation value Ev1 is preferably 1.0 or greater.

It should be noted that in the first mode of embodiment, the transparent dielectric substrate 33 is an example of the transparent dielectric layer. The front surface of the transparent dielectric substrate 33 is an example of the first surface, the rear surface of the transparent dielectric substrate 33 is an example of the second surface, the sensing electrode wires 33SR are an example of the first electrode wires, and the drive electrode wires 31DR are an example of the second electrode wires. In addition, the sensing reference electrode wires 40KR are an example of the first reference electrode wires, and the drive reference electrode wires 41KR are an example of the second reference electrode wires.

As described above, the following advantages can be achieved by means of the first mode of embodiment.

(1) The periodicity of the pattern is maintained to an extent that the occurrence of intense graininess is suppressed in an electrode wire pattern formed by electrode wires having an irregular bent-line shape, in the case of an electrode wire pattern for which the first evaluation value Ev1 is equal to or less than 3.6 This therefore makes it possible to suppress observation of moiré when the electrode wire pattern is superimposed on the pixel pattern, and also makes it possible to suppress observation of graininess. It is therefore possible to suppress a deterioration in the quality of images observed on the display device 100.

(2) The periodicity which causes a periodic structure to be observed in the electrode wire pattern is sufficiently low that moiré is suppressed in the case of an electrode wire pattern for which the first evaluation value Ev1 is equal to or greater than 1.0. Moiré is therefore suitably suppressed when the electrode wire pattern is superimposed on the pixel pattern.

(3) The inter-electrode wire gap Gs, Gd is not excessively large if the gap proportion Rg is between 5% and 10%, so it is possible to suppress observation of moiré resulting from periodicity in the electrode wire pattern attributable to the inter-electrode wire gap Gs, Gd. Furthermore, the inter-electrode wire gap Gs, Gd is not excessively small, so it is possible to precisely form the shape in the vicinity of the bent portions of the electrode wires in the electrode wire pattern, for example it is possible to suppress a situation in which the widths of the electrode wires are locally thicker which would make them appear as points.

A second mode of embodiment of the conductive film, touch panel and display device will be described with reference to FIG. 17 to FIG. 20. The following description will focus on differences between the second mode of embodiment and the first mode of embodiment, and components which are the same as in the first mode of embodiment bear the same reference symbols and will not be described again.

The electrode wire pattern according to the second mode of embodiment comprises a plurality of sensing electrode wires 33SR and a plurality of drive electrode wires 31DR having an irregular bent-line shape in the same way as in the first mode of embodiment. The electrode wire pattern according to the second mode of embodiment is also produced by irregularly displacing the positions of bent portions in a reference pattern formed by sensing reference electrode wires 40KR and drive reference electrode wires 41KR, in the same way as in the first mode of embodiment.

When the conductive film 21 is formed, the electrode wire pattern is formed by bonding a substrate on which the sensing electrode wires 33SR are formed and a substrate on which the drive electrode wires 31DR are formed. In this process, if the positions of the substrates placed one over the other are offset from the design position, the position of the pattern of the drive electrode wires 31DR in relation to the pattern of the sensing electrode wires 33SR will also be offset from the design position, i.e. offset from the ideal position. This front-rear offset which constitutes a pattern offset may produce a new periodic structure in the electrode wire pattern, and this periodic structure may be a cause of moiré.

FIG. 17 schematically shows an example of a power spectrum obtained by performing a two-dimensional Fourier transform in relation to a reference pattern in which front-rear offset occurs, where the first direction D1 is the horizontal direction and the second direction D2 is the vertical direction. FIG. 17 shows characteristic peaks highlighted, and weak points having a low correlation with the pattern are omitted.

The power spectrum shown in FIG. 17 includes front-rear offset in addition to the bright spots G1-G4 as compared with the power spectrum of the reference pattern shown in FIG. 11 which does not include front-rear offset, in other words bright spots G5 can be seen, which indicate a peak in a frequency component derived from a period occurring as a result of offset between the sensing reference pattern and the drive reference pattern. A spatial frequency corresponding to the bright spots G5 is a fourth spatial frequency fh. The bright spots G5 can be seen in the same direction as the bright spots G1, and the fourth spatial frequency fh is smaller than the first spatial frequency fs. To describe this in detail, the period occurring as a result of front-rear offset is a period which is twice the period occurring as a result of oblique line portions being arranged alongside each other, and the frequency commensurate with that period is the fourth spatial frequency fh. That is to say, the fourth spatial frequency fh is a spatial frequency which is half of the first spatial frequency fs.

FIG. 18 shows the relationship between spatial frequency and spectral density in regard to the power spectrum of the reference pattern in which front-rear offset occurs, in accordance with the same method as in FIG. 12. The spectral density is indicated using the common logarithm in the same way as in FIG. 12.

As shown in FIG. 18, in the reference pattern in which front-rear offset has occurred, a projecting peak is present as a peak corresponding to the fourth spatial frequency fh in the low-frequency region, as compared to the case of the reference pattern shown in FIG. 12 in which front-rear offset does not occur.

FIG. 19 schematically shows an example of a power spectrum obtained by performing a two-dimensional Fourier transform in relation to the electrode wire pattern in which front-rear offset occurs, where the first direction D1 is the horizontal direction and the second direction D2 is the vertical direction. Furthermore, FIG. 20 relates to the power spectrum of the electrode wire pattern in which front-rear offset occurs, where the relationship between the spatial frequency and the spectral density is shown by the solid line, and relates to the power spectrum of the reference pattern in which front-rear offset occurs, where the relationship between the spatial frequency and the spectral density is shown by the single-dot chain line, in accordance with the same method as in FIG. 12. The spectral density is depicted using the common logarithm, in the same way as in FIG. 12.

As shown in FIG. 19, in the same way as in FIG. 13, the power spectrum of the electrode wire pattern shows a large number of points distributed in a strip shape, due to the fact that the periodicity of the electrode wire pattern is lower than in the reference pattern because of displacement of the bent portions. As shown in FIG. 20, in the electrode wire pattern, the peaks are scattered and attenuation and extinction of projecting peaks is produced in comparison with the reference pattern. Although a peak corresponding to the fourth spatial frequency fh attributable to front-rear offset also tends to be embedded in the scattered peaks, a peak at the fourth spatial frequency fh may project from the surrounding area, as shown in FIG. 20, depending on the extent of the periodicity of the periodic structure occurring as a result of front-rear offset and the extent to which the periodicity is broken down in the electrode wire pattern.

As described in relation to the first mode of embodiment, the fact that a single peak is formed as a projecting peak in the low-frequency region of the electrode wire pattern means that a specific periodic structure is formed at a frequency of high visibility and a periodic structure is likely to be observed, and moiré is likely to be observed.

A smaller degree of projection from the surrounding area of the peak at the fourth spatial frequency fh therefore makes it possible to suppress the occurrence of moiré.

In order to reduce moiré caused by front-rear offset and suppress a deterioration in the quality of images observed on the display device 100, the inventors of this application introduced a second evaluation value Ev2, which will be described below, as a parameter for evaluating what magnitude of peak at the fourth spatial frequency fh is permitted in relation to the surrounding spectral density.

The defined frequency region is used to calculate the second evaluation value Ev2, in the same way as in the first mode of embodiment. In the same way as in the first mode of embodiment, the defined frequency region is a region of frequencies which are equal to or less than the minimum value of three frequency values, namely the spatial frequency fq which is a value that is one quarter of the first spatial frequency fs, the second spatial frequency fw, and the third spatial frequency fp. For example, the region of frequencies which are equal to or less than the spatial frequency fq is the defined frequency region in FIG. 20.

The second evaluation value Ev2 is the common logarithm of a value obtained by dividing the spectral density of the electrode wire pattern at the fourth spatial frequency fh by the mean value of the spectral density of the electrode wire pattern in the defined frequency region. That is to say, the second evaluation value Ev2 is the common logarithm of the ratio of the spectral density at the fourth spatial frequency fh to the mean value of the spectral density in the defined frequency region, in the electrode wire pattern. The mean value of the spectral density is obtained as the mean of the spectral density in each unit frequency width, for example.

If the second evaluation value Ev2 is equal to or less than 2.0, then the spectral density at the fourth spatial frequency fh is not excessively large in relation to the surrounding area, so it is possible to satisfactorily suppress moiré caused by front-rear offset. In particular, when the position of the pattern of the drive electrode wires 31DR in relation to the pattern of the sensing electrode wires 33SR is offset by x μm in the first direction D1 and by y μm in the second direction D2 in comparison with an ideal electrode wire pattern, and $x^2+y^2>450$, then moiré caused by the front-rear offset is likely to occur. When front-rear offset occurs with $x^2+y^2>450$, it is possible to advantageously reduce moiré if the second evaluation value Ev2 is used as an indicator of the extent of moiré with 2.0 as a threshold.

Furthermore, when front-rear offset occurs, it is also possible to suppress observation of a periodic structure formed by the front-rear offset and therefore to correctly suppress moiré if the electrode wire pattern is constructed in such a way that the first evaluation value Ev1 is equal to or greater than 1.0, as described in relation to the first mode of embodiment.

As described above, it is possible to achieve the following advantages by means of the second mode of embodiment, in addition to advantages (1)-(3) of the first mode of embodiment.

(4) If the second evaluation value Ev2 is equal to or less than 2.0, then the periodicity of the periodic structure formed when front-rear offset occurs in the electrode wire pattern is kept at a low level. This makes it possible to suppress observation of moiré resulting from such periodicity. Even if front-rear offset occurs in the electrode wire pattern, it is therefore possible to suppress a deterioration in the quality of images observed on the display device 100.

(5) When the first evaluation value Ev1 is equal to or greater than 1.0, then even if front-rear offset occurs in the electrode wire pattern, observation of a periodic structure at low frequencies, including a periodic structure resulting from the front-rear offset, can be suppressed, so observation of moiré is correctly suppressed.

The modes of embodiment described above may be implemented with the following modifications.

In the modes of embodiment described above, the electrode wire pattern was produced by setting displacement regions Ss, Sd having the same displacement rates Rs, Rd at the reference bent portions 40Q of the sensing reference pattern and the reference bent portions 41Q of the drive reference pattern, and by arranging the bent portions 33Q, 31Q at displaced positions within these displacement regions Ss, Sd. The method for producing the electrode wire pattern is not limited to the above-mentioned method, and for example, it is possible for the displacement rate Rs of the sensing reference pattern and the displacement rate Rd of the drive reference pattern to be different, and it is possible for the shapes of the displacement regions Ss, Sd to be other than an isosceles triangle. Furthermore, the bent portions may be displaced in sets of facing reference bent portions in adjacent reference electrode wires, and it is possible for the bent portions to be displaced only in the direction of arrangement of the electrode wires or the direction of extension of the electrode wires. Furthermore, bent portions resulting from displacement of facing reference bent portions, in other words bent portions of adjacent electrode wires in the electrode wire pattern, may come into contact. Furthermore, the gap proportion may be different in the sensing reference pattern and the drive reference pattern. The important point is that the electrode wire pattern should be a pattern in which bent portions in the reference pattern are irregularly displaced in relation to the order of arrangement of the bent portions in the reference electrode wires 40KR, 41KR. Moreover, the parameters determining the reference pattern may be derived by feature analysis of the electrode wire pattern or by extracting bright spots from the power spectrum of the electrode wire pattern, among other things, for example.

In the modes of embodiment described above, the bent portions 33Q of the sensing electrode wires 33SR and the bent portions 31Q of the drive electrode wires 31DR are point-like portions joining the linear short-wire portions 33E, 31E. This is not limiting, and the bent portions 33Q, 31Q may equally be portions joining, in a curved manner, two adjacent short-wire portions 33E, 31E in the direction of extension of the electrodes.

The electrode wire pattern should include the feature of the first mode of embodiment or the second mode of embodiment at least in a region in which it is wished to suppress a deterioration in the quality of images, e.g., in a portion disposed in a central region or the like as seen from the operating surface 20S. Furthermore, the pattern comprising the plurality of sensing electrode wires 33SR may be a pattern in which a pattern of a partial region contained in said pattern is repeated along the first direction D1 or the second direction D2. In the same way, the pattern comprising the plurality of drive electrode wires 31DR may be a pattern in which a pattern of a partial region contained in said pattern is repeated along the first direction D1 or the second direction D2. In this case, a portion contained in the abovementioned partial region, in other words a repeat unit region, constitutes a first electrode wire or a second electrode wire.

As shown in FIG. 21, the transparent substrate 31 and the transparent adhesion layer 32 may be omitted from the conductive film 21 forming part of the touch panel 20. In such a configuration, the rear surface of the transparent dielectric substrate 33 facing the display panel 10 is set as the drive electrode surface 31S, and the drive electrodes 31DP are located on the drive electrode surface 31S. The front surface of the transparent dielectric substrate 33 on the opposite side to the rear surface is the sensing electrode surface 33S, and the sensing electrodes 33SP are located on the sensing electrode surface 33S. It should be noted that in such a configuration, the drive electrodes 31DP are formed, for example, by using etching to pattern one thin film formed on one surface of the transparent dielectric substrate 33, and the sensing electrodes 33SP are formed, for example, by using etching to pattern one thin film formed on the other surface of the transparent dielectric substrate 33.

It should be noted that it is simpler to form the electrode wires with a configuration in which the sensing electrodes 33SP and the drive electrodes 31DP are formed on different base materials, as in the modes of embodiment described above, than with a configuration in which said electrode wires are formed on both surfaces of one base material. It is therefore highly effective to apply the configuration of the second mode of embodiment to a configuration in which the sensing electrodes 33SP and the drive electrodes 31DP are formed on different base materials.

As shown in FIG. 22, the structural elements of the touch panel 20 may be positioned in the following manner in succession from the structural element closest to the display panel 10: drive electrodes 31DP, transparent substrate 31, transparent adhesion layer 32, transparent dielectric substrate 33, sensing electrodes 33SP, transparent adhesion layer 23, cover layer 22.

In this configuration, for example, the drive electrodes 31DP are formed on one surface of the transparent substrate 31 constituting the drive electrode surface 31S, and the sensing electrodes 33SP are formed on one surface of the transparent dielectric substrate 33 constituting the sensing electrode surface 33S. The surface of the transparent substrate 31 on the opposite side to the drive electrode surface 31S, and the surface of the transparent dielectric substrate 33 on the opposite side to the sensing electrode surface 33S are bonded by means of the transparent adhesion layer 32. In this case, the transparent substrate 31, transparent adhesion layer 32 and transparent dielectric substrate 33 form the transparent dielectric layer, and the sensing electrode surface 33S of the transparent dielectric substrate 33 is the first surface, while the drive electrode surface 31S of the transparent substrate 31 is the second surface.

The display panel 10 and the touch panel 20 need not be formed separately, and the touch panel 20 may be formed as a single piece with the display panel 10. In such a configuration, for example, an in-cell structure may be adopted, in which the plurality of drive electrodes 31DP of the conductive film 21 are positioned on the TFT layer 13, while the plurality of sensing electrodes 33SP are positioned between the color filter substrate 16 and the upper-side polarizing plate 17. Alternatively, an on-cell structure may also be adopted, in which the conductive film 21 is positioned between the color filter substrate 16 and the upper-side polarizing plate 17. In such a configuration, the layers between the drive electrodes 31DP and the sensing electrodes 33SP form the transparent dielectric layer.

What is claimed is:

1. A conductive film comprising:
a transparent dielectric layer having a first surface and a second surface which is a surface on the opposite side to the first surface;
a plurality of first electrode wires extending in a first direction on the first surface while bending irregularly and also arranged along a second direction orthogonal to the first direction; and
a plurality of second electrode wires extending in the second direction on the second surface while bending irregularly and also arranged along the first direction, wherein a pattern formed by the plurality of first electrode wires and the plurality of second electrode wires when viewed from a direction facing the first surface constitutes an electrode wire pattern;
imaginary electrode wires extending in the first direction while repeatedly bending at a predetermined period and also arranged along the second direction constitute first reference electrode wires, imaginary electrode wires extending in the second direction while repeatedly bending at a predetermined period and also arranged along the first direction constitute second reference electrode wires, and bent portions of the plurality of first reference electrode wires and the plurality of second reference electrode wires face each other in the adjacent reference electrode wires;

a pattern in which the plurality of first reference electrode wires and the plurality of second reference electrode wires are laid one over the other constitutes a reference pattern, and the electrode wire pattern is a pattern in which the bent portions of the reference pattern are irregularly displaced in relation to the order of arrangement of the bent portions of the reference electrode wires;

in a power spectrum obtained by means of a two-dimensional Fourier transform of each of the electrode wire pattern and the reference pattern, a value obtained by dividing, at predetermined frequency widths, the cumulative value of spectral intensity of each frequency width by said frequency width is a spectral density;

and when a spatial frequency of a peak derived from the periodicity of arrangement of an oblique line portion of the electrode wires in the reference pattern is a first spatial frequency, a spatial frequency of a peak appearing in accordance with the magnitude of half of the period of the first reference electrode wires in the reference pattern is a second spatial frequency, a spatial frequency of a peak appearing in accordance with the magnitude of the arrangement interval of the first reference electrode wires in the reference pattern is a third spatial frequency, and a region of frequencies which are one of equal to and less than the minimum value of a value which is one quarter of the first spatial frequency, the second spatial frequency and the third spatial frequency is a defined frequency region, a first evaluation value, which is a common logarithm of a value obtained by dividing the cumulative value of the spectral density in the defined frequency region of the electrode wire pattern by the cumulative value of the spectral density in the defined frequency region of the reference pattern, is one of 3.6 and less.

2. The conductive film according to claim 1, wherein the first evaluation value is one of 1.0 and greater.

3. The conductive film according to claim 1, wherein the proportion of the length of the gap between the adjacent reference electrode wires in relation to the arrangement interval of the reference electrode wires is between 5% and 10% in the plurality of first reference electrode wires and the plurality of second reference electrode wires.

4. The conductive film according to claim 1, wherein, in the power spectrum, when a frequency which is half of the first spatial frequency constitutes a fourth spatial frequency, a second evaluation value, which is a common logarithm of a value obtained by dividing the spectral density of the electrode wire pattern at the fourth spatial frequency by the mean value of the spectral density of the electrode wire pattern in the defined frequency region, is one of 2.0 and less.

5. A touch panel comprising:

a conductive film according to claim 1;

a cover layer for covering the conductive film; and peripheral circuitry for measuring electrostatic capacity between the electrode wires arranged on the first surface and the electrode wires arranged on the second surface.

6. A display device comprising:

a display panel having a plurality of pixels arranged in a grid shape to display information;

a touch panel which transmits the information displayed by the display panel; and a control unit for controlling driving of the touch panel, wherein the touch panel is the touch panel according to claim 5.

* * * * *